United States Patent
Lango et al.

(10) Patent No.: US 7,945,688 B1
(45) Date of Patent: May 17, 2011

(54) METHODS AND APPARATUS FOR REDUCING STREAMING MEDIA DATA TRAFFIC BURSTS

(75) Inventors: Jason Lango, Mountain View, CA (US); Konstantinos Roussos, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 892 days.

(21) Appl. No.: 09/981,328

(22) Filed: Oct. 16, 2001

Related U.S. Application Data

(60) Provisional application No. 60/297,943, filed on Jun. 12, 2001.

(51) Int. Cl.
  *G06F 15/16* (2006.01)
  *H04N 7/173* (2006.01)
(52) U.S. Cl. ........ 709/231; 709/203; 725/101; 725/125; 725/87
(58) Field of Classification Search .................. 709/231, 709/219, 238, 203; 370/503; 725/105, 87, 725/101, 125
  See application file for complete search history.

(56) References Cited

U.S. PATENT DOCUMENTS

| | | | |
|---|---|---|---|
| 5,043,885 A | | 8/1991 | Robinson |
| 5,402,416 A | * | 3/1995 | Cieslak et al. ................. 370/236 |
| 5,583,561 A | * | 12/1996 | Baker et al. ...................... 725/93 |
| 5,586,264 A | | 12/1996 | Belknap et al. |
| 5,596,420 A | * | 1/1997 | Daum ............................ 386/110 |
| 5,615,362 A | | 3/1997 | Jensen et al. |
| 5,737,747 A | | 4/1998 | Vishlitzky et al. |
| 5,799,185 A | | 8/1998 | Watanabe |
| 5,819,292 A | | 10/1998 | Hitz et al. |
| 5,854,887 A | | 12/1998 | Kindell et al. |
| 5,918,020 A | | 6/1999 | Blackard et al. |
| 5,953,506 A | * | 9/1999 | Kalra et al. .................... 709/231 |
| 5,960,452 A | | 9/1999 | Chi |
| 5,963,962 A | | 10/1999 | Hitz et al. |
| 6,038,230 A | * | 3/2000 | Ofek .............................. 370/389 |
| 6,038,570 A | | 3/2000 | Hitz et al. |
| 6,064,676 A | * | 5/2000 | Slattery et al. ................ 370/412 |

(Continued)

OTHER PUBLICATIONS

H. Schulzrinne et al., "Real Time Streaming Protocol (RTSP)", Apr. 1998, pp. 1-86, The Internet Society.

(Continued)

*Primary Examiner* — Larry Donaghue
*Assistant Examiner* — Asghar Bilgrami
(74) *Attorney, Agent, or Firm* — Perkins Coie LLP

(57) ABSTRACT

A method for reducing output traffic bursts in a streaming media cache includes receiving a request from a first client system for a stream of media data, the stream of media data including a first streaming media data packet and a second streaming media data packet, receiving a request from a second client system for the stream of media data, receiving the first streaming media data packet from an upstream server, the first streaming media data packet including a delivery time, determining a first modified delivery time for the first streaming media data packet, determining a second modified delivery time for the first streaming media data packet, the first modified delivery time different from the second modified delivery time, modifying the first streaming media data packet with the first modified delivery time to form a first modified first streaming media data packet, modifying the first streaming media data packet with the second modified delivery time to form a second modified first streaming media data packet, outputting the first modified first streaming media data packet to the first client system at the first modified delivery time, and outputting the second modified first streaming media data packet to the second client system at the second modified delivery time.

11 Claims, 14 Drawing Sheets

U.S. PATENT DOCUMENTS

| | | | |
|---|---|---|---|
| 6,085,193 | A | 7/2000 | Malkin et al. |
| 6,111,896 | A * | 8/2000 | Slattery et al. ............... 370/535 |
| 6,275,496 | B1 | 8/2001 | Burns et al. |
| 6,324,182 | B1 | 11/2001 | Burns et al. |
| 6,343,083 | B1 | 1/2002 | Mendelson et al. |
| 6,351,471 | B1 | 2/2002 | Robinett et al. |
| 6,351,474 | B1 | 2/2002 | Robinett et al. |
| 6,366,970 | B1 | 4/2002 | Wolff et al. |
| 6,370,688 | B1 * | 4/2002 | Hejna, Jr. ...................... 725/101 |
| 6,377,972 | B1 * | 4/2002 | Guo et al. ...................... 709/201 |
| 6,407,680 | B1 | 6/2002 | Lai et al. |
| 6,424,993 | B1 * | 7/2002 | Weber ........................... 709/203 |
| 6,442,141 | B1 * | 8/2002 | Borella et al. ............... 370/248 |
| 6,463,508 | B1 | 10/2002 | Wolf et al. |
| 6,484,212 | B1 | 11/2002 | Markowitz et al. |
| 6,505,169 | B1 | 1/2003 | Bhagavath et al. |
| 6,516,361 | B2 | 2/2003 | Lym et al. |
| 6,522,649 | B1 * | 2/2003 | Stallkamp .................... 370/389 |
| 6,593,860 | B2 | 7/2003 | Lai et al. |
| 6,594,699 | B1 | 7/2003 | Sahai et al. |
| 6,594,751 | B1 | 7/2003 | Leivent |
| 6,651,103 | B1 | 11/2003 | Markowitz et al. |
| 6,665,755 | B2 | 12/2003 | Modelski et al. |
| 6,680,976 | B1 * | 1/2004 | Chen et al. ............... 375/240.26 |
| 6,708,213 | B1 | 3/2004 | Bommaiah et al. |
| 6,721,850 | B2 | 4/2004 | Hofmann et al. |
| 6,742,082 | B1 | 5/2004 | Lango et al. |
| 6,744,763 | B1 | 6/2004 | Jones et al. |
| 6,747,991 | B1 | 6/2004 | Hemy et al. |
| 6,760,765 | B1 | 7/2004 | Asai et al. |
| 6,829,648 | B1 | 12/2004 | Jones et al. |
| 6,917,984 | B1 * | 7/2005 | Tan ................. 709/238 |
| 6,990,512 | B1 | 1/2006 | Major et al. |
| 7,099,953 | B2 | 8/2006 | Horiuchi et al. |
| 7,191,242 | B1 | 3/2007 | Serenyi et al. |
| 7,333,431 | B2 * | 2/2008 | Wen et al. ................. 370/230.1 |
| 7,346,698 | B2 * | 3/2008 | Hannaway .................... 709/231 |
| 7,356,575 | B1 | 4/2008 | Shapiro |
| 7,444,419 | B2 | 10/2008 | Green |
| 7,478,164 | B1 | 1/2009 | Lango et al. |
| 7,496,678 | B2 | 2/2009 | Yadav et al. |
| 2001/0003193 | A1 | 6/2001 | Woodring et al. |
| 2001/0034786 | A1 | 10/2001 | Baumeister et al. |
| 2001/0052132 | A1 * | 12/2001 | Fryer ........................... 725/105 |
| 2002/0029282 | A1 | 3/2002 | Buddhikot et al. |
| 2002/0042837 | A1 | 4/2002 | Ebata et al. |
| 2002/0047899 | A1 | 4/2002 | Son et al. |
| 2002/0056126 | A1 * | 5/2002 | Srikantan et al. ............... 725/87 |
| 2002/0071654 | A1 | 6/2002 | Notoya et al. |
| 2002/0097750 | A1 * | 7/2002 | Gunaseelan et al. .......... 370/503 |
| 2002/0116473 | A1 * | 8/2002 | Gemmell ...................... 709/219 |
| 2002/0116585 | A1 | 8/2002 | Scherr |
| 2002/0162047 | A1 | 10/2002 | Peters et al. |
| 2002/0169926 | A1 | 11/2002 | Pinckney et al. |
| 2002/0181506 | A1 | 12/2002 | Loguinov |
| 2003/0005452 | A1 | 1/2003 | Rodriguez |
| 2003/0055910 | A1 | 3/2003 | Amini et al. |
| 2003/0067877 | A1 | 4/2003 | Sivakumar et al. |
| 2003/0189936 | A1 | 10/2003 | Terrell et al. |
| 2003/0217113 | A1 | 11/2003 | Katz et al. |
| 2003/0236904 | A1 | 12/2003 | Walpole et al. |
| 2004/0039837 | A1 * | 2/2004 | Gupta et al. ................. 709/231 |
| 2004/0162787 | A1 | 8/2004 | Madison et al. |
| 2004/0163123 | A1 | 8/2004 | Okada et al. |
| 2004/0202148 | A1 | 10/2004 | Kuehnel |
| 2005/0117580 | A1 | 6/2005 | del Val et al. |
| 2005/0165915 | A1 | 7/2005 | Hejna, Jr. |
| 2005/0223107 | A1 | 10/2005 | Mine et al. |
| 2006/0047774 | A1 | 3/2006 | Bowman et al. |
| 2006/0064500 | A1 | 3/2006 | Roth et al. |
| 2006/0106961 | A1 | 5/2006 | Ebata et al. |
| 2006/0184667 | A1 | 8/2006 | Clubb et al. |
| 2006/0218611 | A1 | 9/2006 | Son et al. |
| 2007/0094407 | A1 | 4/2007 | Serenyi et al. |
| 2007/0143468 | A1 | 6/2007 | Serenyi et al. |
| 2008/0095339 | A1 | 4/2008 | Elliott et al. |

OTHER PUBLICATIONS

NetCache™ 5.1 Web Cache First-Time Configuration Guide, Network Appliance, Inc., Sunnyvale, California, Apr. 2001.
NetCache™ 5.1 Routine Administration Guide, Network Appliance, Inc., Sunnyvale, California, Apr. 2001.
NetCache™ 5.1 Configuration Guide, Network Appliance, Inc., Sunnyvale, California, Apr. 2001.
NetCache™ 5.1 Deployment Planning Guide, Network Appliance, Inc., Sunnyvale, California, Apr. 2001.
NetCache™ 5.1 Features and Configuration Planning Guide, Network Appliance, Inc., Sunnyvale, California, Apr. 2001.
NetCache™ 5.1 Streaming Media Cache First-Time Configuration Guide, Network Appliance, Inc., Sunnyvale, California, Apr. 2001.
NetCache™ 5.1 Accelerator First-Time Configuration Guide, Network Appliance, Inc., Sunnyvale, California, Apr. 2001.
Co-pending U.S. Appl. No. 10/974,427, filed Oct. 26, 2004.
Co-pending U.S. Appl. No. 09/981,644, filed Oct. 16, 2001.
Co-pending U.S. Appl. No. 11/228,689, filed Sep. 16, 2005.
Co-pending U.S. Appl. No. 10/365,074, filed Feb. 12, 2003.
Notice of Allowance Mailed Feb. 26, 2010 in Co-pending U.S. Appl. No. 10/974,427, filed Oct. 26, 2004.
Notice of Allowance Mailed Nov. 2, 2009 in Co-pending U.S. Appl. No. 10/974,427, filed Oct. 26, 2004.
Notice of Allowance Mailed Nov. 10, 2008 in Co-pending U.S. Appl. No. 09/981,644, filed Oct. 16, 2001.
Notice of Allowance Mailed Oct. 6, 2008 in Co-pending U.S. Appl. No. 09/981,644, filed Oct. 16, 2001.
Notice of Allowance Mailed Dec. 12, 2008 in Co-pending U.S. Appl. No. 11/228,689, filed Sep. 16, 2005.
Advisory Action Mailed Jul. 12, 2007 in Co-pending U.S. Appl. No. 09/981,644, filed Oct. 16, 2001.
Advisory Action Mailed May 12, 2008 in Co-pending U.S. Appl. No. 10/365,074, filed Feb. 12, 2003.
Final Office Action Mailed Dec. 9, 2008 in Co-pending U.S. Appl. No. 10/974,427, filed Oct. 26, 2004.
Final Office Action Mailed May 9, 2007 in Co-pending U.S. Appl. No. 09/981,644, filed Oct. 16, 2001.
Final Office Action Mailed Jul. 7, 2005 in Co-pending U.S. Appl. No. 09/981,644, filed Oct. 16, 2001.
Final Office Action Mailed Jan. 15, 2010 in Co-pending U.S. Appl. No. 10/365,074, filed Feb. 12, 2003.
Final Office Action Mailed Apr. 7, 2009 in Co-pending U.S. Appl. No. 10/365,074, filed Feb. 12, 2003.
Final Office Action Mailed Feb. 25, 2008 in Co-pending U.S. Appl. No. 10/365,074, filed Feb. 12, 2003.
Final Office Action Mailed Apr. 16, 2007 in Co-pending U.S. Appl. No. 10/365,074, filed Feb. 12, 2003.
Non-Final Office Action Mailed Apr. 28, 2009 in Co-pending U.S. Appl. No. 10/974,427, filed Oct. 26, 2004.
Non-Final Office Action Mailed Jun. 4, 2008 in Co-pending U.S. Appl. No. 10/974,427, filed Oct. 26, 2004.
Non-Final Office Action Mailed Feb. 6, 2008 in Co-pending U.S. Appl. No. 09/981,644, filed Oct. 16, 2001.
Non-Final Office Action Mailed Aug. 23, 2007 in Co-pending U.S. Appl. No. 09/981,644, filed Oct. 16, 2001.
Non-Final Office Action Mailed Nov. 15, 2006 in Co-pending U.S. Appl. No. 09/981,644, filed Oct. 16, 2001.
Non-Final Office Action Mailed Jan. 10, 2006 in Co-pending U.S. Appl. No. 09/981,644, filed Oct. 16, 2001.
Non-Final Office Action Mailed Jan. 6, 2005 in Co-pending U.S. Appl. No. 09/981,644, filed Oct. 16, 2001.
Non-Final Office Action Mailed Jun. 26, 2008 in Co-pending U.S. Appl. No. 11/228,689, filed Sep. 16, 2005.
Non-Final Office Action Mailed Jul. 31, 2009 in Co-pending U.S. Appl. No. 10/365,074, filed Feb. 12, 2003.
Non-Final Office Action Mailed Sep. 11, 2008 in Co-pending U.S. Appl. No. 10/365,074, filed Feb. 12, 2003.
Non-Final Office Action Mailed Sep. 6, 2007 in Co-pending U.S. Appl. No. 10/365,074, filed Feb. 12, 2003.
Non-Final Office Action Mailed Oct. 6, 2006 in Co-pending U.S. Appl. No. 10/365,074, filed Feb. 12, 2003.

Notice of Allowance Mailed Apr. 19, 2010 in Co-pending U.S. Appl. No. 10/974,427, filed Oct. 26, 2004.
Non-Final Office Action Mailed Aug. 31, 2010 in Co-pending U.S. Appl. No. 10/365,07, filed Feb. 12, 2003.

Notice of Allowance Mailed Feb. 4, 2011 in Co-pending U.S. Appl. No. 10/365,074 filed Feb. 12, 2003.

* cited by examiner

DATA FORMAT HIERARCHY

METHODS AND APPARATUS FOR REDUCING STREAMING MEDIA DATA TRAFFIC BURSTS

CROSS-REFERENCE TO RELATED APPLICATIONS

The present invention disclosure claims priority to Provisional U.S. Patent Application No. 60/297,943, filed Jun. 12, 2001, entitled Streaming Media Payload Storage Method and Apparatus. This application is herein by incorporated by reference for all purposes. Co-pending U.S. Patent Application, titled Caching Media Data Using Content-Sensitive Identifiers, filed Oct. 16, 2001, Ser. No. 09/981,668, Client Reference No.: P01-1249.2 and co-pending U.S. Patent Application, titled Pre-computing Streaming Media Payload Method and Apparatus, filed Oct. 16, 2001, Ser. No. 09/981,667, Client Reference No.: P01-1248.2 are also incorporated by reference for all purposes.

BACKGROUND OF THE INVENTION

The present invention relates to streaming media data. More particularly, the present invention relates to methods and apparatus for splitting streams of media data while reducing traffic bursts.

With conventional television or radio broadcasting, powerful transmitters are used to broadcast encoded audio and/or video signals across the airwaves. These signals are received and converted back to audio and/or video signals for output to users. In this type of open air broadcasting, the amount of broadcast power does not vary depending upon the number of viewers or listeners. For example, a radio station may output 5000 Megawatts of power day and night, although the number of listeners at night may be much smaller than during the day.

The same situation is also believed to be true with cable-TV broadcasts. Specifically, for cable TV, signals are transmitted across cable TV lines with the help of a number of cable repeaters. With this type of broadcasting, the amount of broadcast power also does not vary depending upon the number of viewers or listeners. For example, a cable TV station such as CNN outputs the same signal day and night, regardless of the actual viewership.

It has been discovered by the inventors, that in contrast to the above broadcasting models, the situation is different with wide-area-network (WAN) based broadcasts, such as live Internet broadcasts. In particular, attempting to broadcast across the Internet, raises many new problems not considered before. For example, it often matters to an Internet broadcaster how many users are receiving a broadcast at one time. Typical Internet broadcast servers have only a limited amount of output bandwidth, however each user that receives a transmission from the server requires some of that output bandwidth. Accordingly, each server can only support a limited number of users at a time.

It has also been discovered by the inventors that when delivering "live" Internet broadcasts to users, typically via streams of packetized media data, the broadcasting server produces high peaks of network traffic. In the present disclosure, high peaks of network traffic refer to a large number of data packets being delivered in a short amount of time. Traffic peaks are also referred to below as traffic bursts.

One drawback in having high peaks or high bursts of traffic is that downstream routers, servers, and the like may not be able to handle the amounts of traffic. As is known, routers and servers and the like have internal buffers to buffer input traffic in the case where the input traffic rate is faster than the output traffic rate. However, when the traffic burst is very high or large, these buffers fill up and data packets are dropped. As a result, users coupled to the routers or the like receive broadcast data streams that are degraded in quality and in smoothness because of the dropped data packets.

Thus what is required are improved methods and apparatus for providing Internet broadcasts that better address the problems described above, while reducing the drawbacks.

BRIEF SUMMARY OF THE INVENTION

The present invention relates to streaming media data. More particularly, the present invention relates to methods for providing streaming media data to multiple clients while reducing peak traffic bursts. The methods may be implemented in a streaming media cache or other computer system.

In the present disclosure "Streaming media" data generally refers to media intended to be transported at a select (often, subscribed) bit rate, and with a desired timeliness. The streaming media is adapted for playback in a desired order without regard to the order the streaming media data is received by a client system. Steaming media generally conforms to a real-time delivery protocol, such as, e.g., RTSP, RTP, or the like. The media (media clip) represented in the streaming media data may include static images, video data, audio data, executable files, presentation data, applet data, data files, and the like. Further, the streaming media data may include "live" data streams.

According to an aspect of the present invention, a method for reducing output traffic bursts in a streaming media cache is disclosed. One technique includes receiving a request from a first client system for a stream of media data, the stream of media data including a first streaming media data packet and a second streaming media data packet, receiving a request from a second client system for the stream of media data, and receiving the first streaming media data packet from an upstream server, the first streaming media data packet including a delivery time. Additional processes may include determining a first modified delivery time for the first streaming media data packet, determining a second modified delivery time for the first streaming media data packet, the first modified delivery time different from the second modified delivery time, and modifying the first streaming media data packet with the first modified delivery time to form a first modified first streaming media data packet. Still other methods may include modifying the first streaming media data packet with the second modified delivery time to form a second modified first streaming media data packet, outputting the first modified first streaming media data packet to the first client system at the first modified delivery time, and outputting the second modified first streaming media data packet to the second client system at the second modified delivery time.

According to another aspect of the present invention, a computer system for providing streaming media data to client systems with reduced peak traffic bursts is described. One such system may include a number of execution process threads including a first thread configured to receive a request from a first client system and a second client system for a stream of data packets, wherein the stream includes a first data packet and a second data packet, the first thread also configured to specify a first client delay and a second client delay, and a second thread coupled to the first thread, the second thread configured to receive the first data packet and the second data packet from an upstream server, wherein the first data packet specifies a first delivery time and the second data packet specifies a second delivery time, the second thread also configured to form a first delayed first data packet in response to the first client delay and to form a second delayed first data packet in response to the second client delay, wherein the first delayed first data packet specifies a first delayed delivery time and the second delayed first data packet specifies a second delayed delivery time. Still other systems may also include additional execution threads such as a third thread configured to receive the first delayed first data packet and to provide the first delayed first data packet to the first client system in response to the first delayed delivery time, and a fourth thread configured to receive the second delayed first data packet and to provide the second delayed first data packet to the second client system in response to the second delayed delivery time.

According to yet another aspect of the invention, a method for reducing peak output traffic bursts in a computer system where a first packet of data is scheduled to be delivered to more than one downstream client system substantially simultaneously is disclosed. One method includes delaying a packet delivery time for the first packet of data to be delivered to a first downstream client system, and delaying the packet delivery time for the first packet of data to be delivered to a second downstream client system. The first packet of data is thus to be delivered to the first downstream client system at a time different than when the first packet of data is to be delivered to the second downstream client system.

DETAILED DESCRIPTION OF THE INVENTION

Figure 1A:
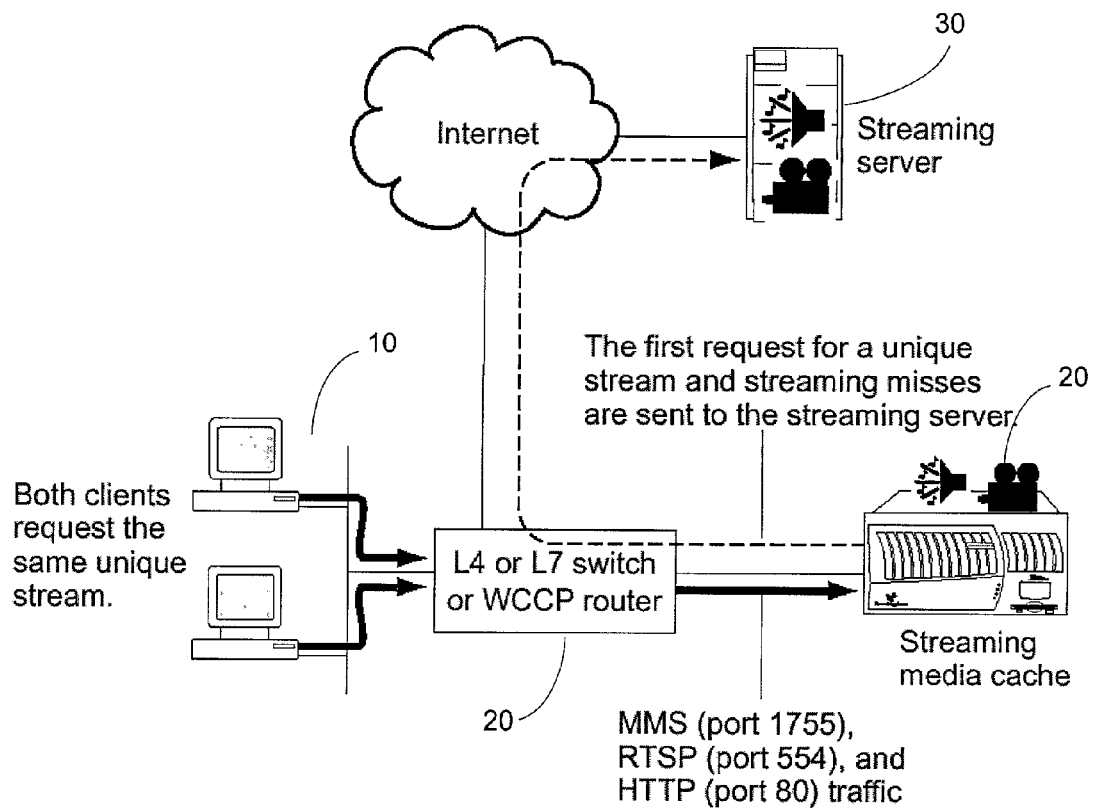
FIGS. 1A-C illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media.

If such a request is determined by router 40, that request is redirected to streaming media cache 20, and not media data server 30. Once streaming media cache 20 receives the request, it makes a determination whether the stream (the entire media clip) or the requested portion of the stream (the request portion of the media clip) has already been cached. If the data has been previously stored, streaming media cache 20 provides the streaming media to client system 10.

In the present embodiment, if the data (requested portion of a stream) has not previously been stored in streaming media cache 20, as when the data is "live" data, streaming media cache 20 sends a request to media server 30 for the live stream of data. As the live stream of data is delivered to streaming media cache 20, it is forwarded to client system 10, and the portion of the stream of data is stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
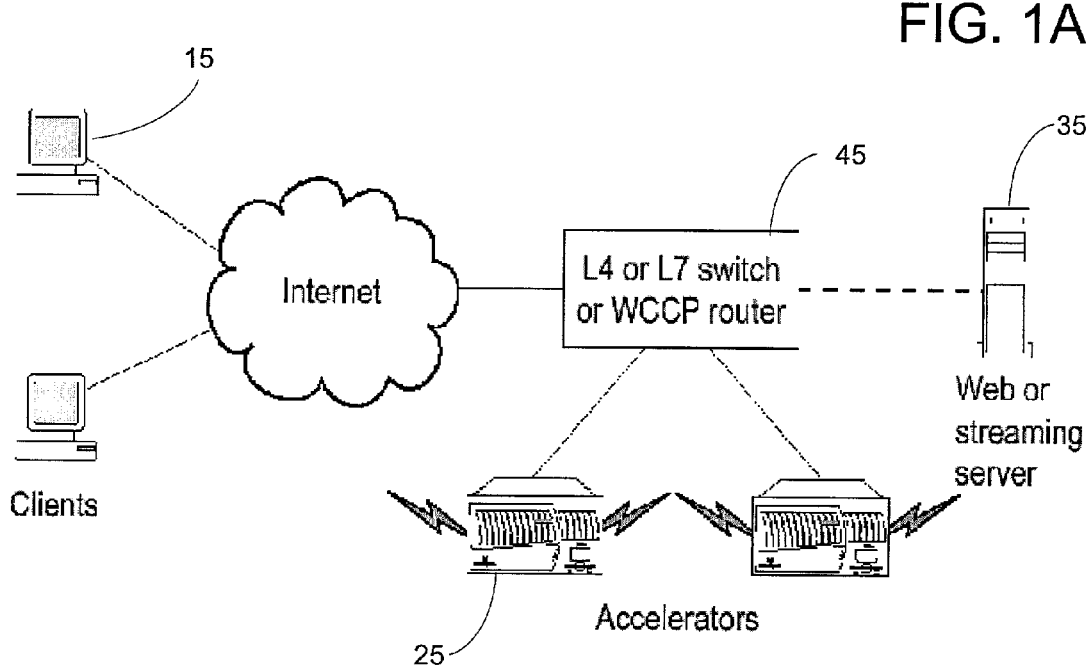

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache (server) 25, media data server 35 (streaming server), and a router 42. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 42. Router 42 may be embodied as a layer 4 or layer 7 switch, a WCCP router, or any other conventional switch or router. In this embodiments, router 42 would be configured to recognize when a request is made by client system 10 for a stream of streaming media.

If such a request is determined by router 42, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 10.

In the present embodiment, if the data has is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail below.

For this embodiment, the streaming media traffic is sent by media cache 20 to specific ports. In specific embodiments, for RealSystem streaming media, media cache 20 sends streaming media via TCP on port 554; for QuickTime (RTSP) streaming media, media cache 20 sends streaming media via TCP on port 554 and/or via UDP on port 2001; for Microsoft Media Streaming (MMS) streaming media, media cache 20 sends streaming media data via TCP on port 1755; and for HTTP streaming media, media cache 20 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 1C:
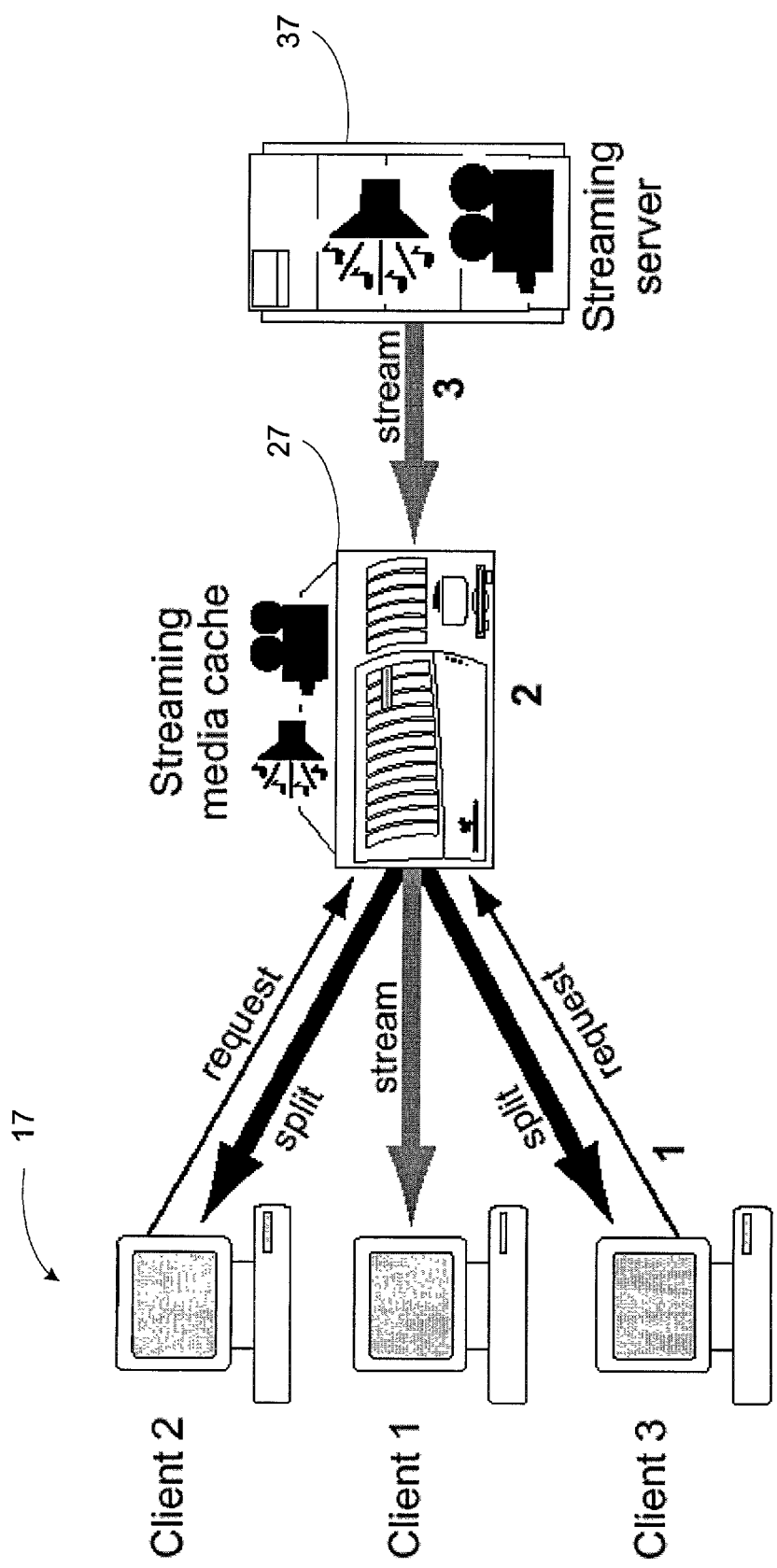

FIG. 1C illustrates another embodiment of the present embodiment. In particular, FIG. 1C illustrates an embodiment where a "live" stream of data is delivered to multiple client systems. FIG. 1C illustrates a streaming media server 37, a streaming media cache 27, and a series of client systems 17.

In this embodiment, streaming media cache 27 is used to provide "live" streaming media data received from streaming media server 37, or the like, to client systems 17. It should be understood that streaming media server 37 may itself be an "upstream" streaming media cache, or other source of "live" streaming media data.

In these embodiments "live" data may be real-time data, such as a audio and/or video webcast of a live performance. In other embodiments "live" data may be data that is to be a controlled or "coordinated" webcast at a particular time, even though the data is pre-recorded. For example, the "live" data may represent a time-shifted event, a pay-per-view event, a scheduled program, or the like. As examples, "live" data streams may represent a world-wide corporate press release, a full-length movie, a censor-delayed webcast, and the like. Accordingly, "live" data streams in these embodiments refer to data streams that are to be substantially simultaneously delivered to multiple client systems.

As illustrated in FIG. 1C, a first Client system may be receiving the live stream of data via streaming media cache 27. Later, a second and third client systems may request the same live stream of data. In this case, in response to the second and third client requests, the live stream that the first client is being sent, is split and sent to the second and third clients. Thus, if the second and/or third requests are made 10 minutes after the live stream of data starts, the second and third clients miss the first 10 minutes, and begin receiving the live stream at that point (e.g. 10 minutes into the stream).

Figure 2:
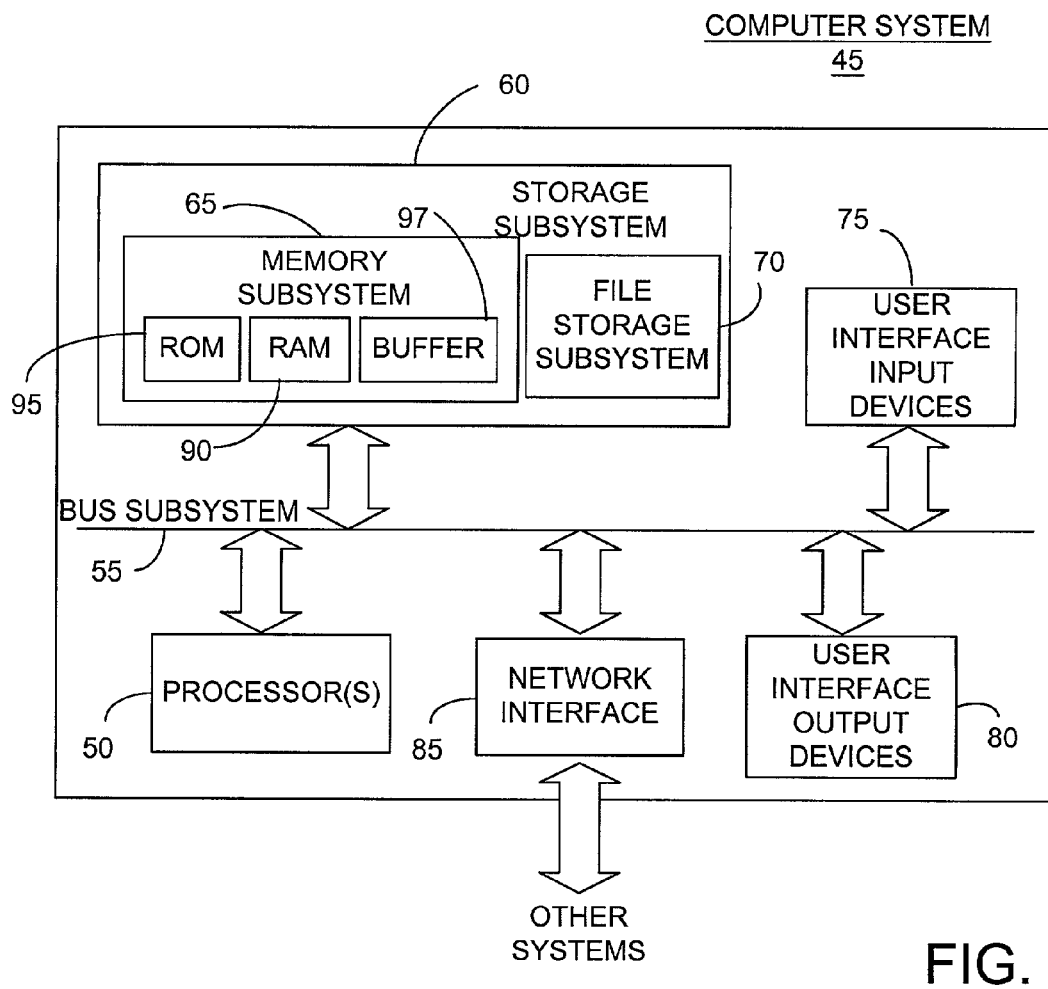
FIG. 2 is a simplified block diagram of a computer system according to an embodiment of the present invention.

FIG. 2 is a simplified block diagram of a computer system 45 according to an embodiment of the present invention. Computer system 45 may be used as client system 10, streaming media cache 20, and/or media data server system 30. Computer system 45 may be a stand-alone computer system, a computer "appliance," or the like.

As shown in FIG. 2, computer system 45 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 45. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 50.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 45.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor(s) 50 of computer system 45. In a distributed environment, the software modules may be stored on a plurality of computer systems and executed by processors of the plurality of computer systems. Storage subsystem 60 may also provide a repository for storing various databases that may be used to store information according to the teachings of the present invention. For example, a cache entry hash table, discussed below, may be stored in storage subsystem 60 of media server 30. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files stored in computer readable media, and computer readable media may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. As will be discussed below, the type of data may include streaming media payload data.

In the present embodiment, computer system 45 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 45 communicate with each other as intended. The various subsystems and components of computer system 45 need not be at the same physical location but may be distributed at various locations within a network. Although bus subsystem 55 is shown schematically as a single bus, alternative embodiments of the bus subsystem may utilize multiple busses.

Computer system 45 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 45 depicted in FIG. 1B is intended only as a specific example for purposes of illustrating an embodiment of the computer system.

In one embodiment, computer system 45 is embodied as a network cache (appliance) in a product called "NetCache" available from NetworkAppliance, Incorporated. The NetCache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 1B.

Figure 3:
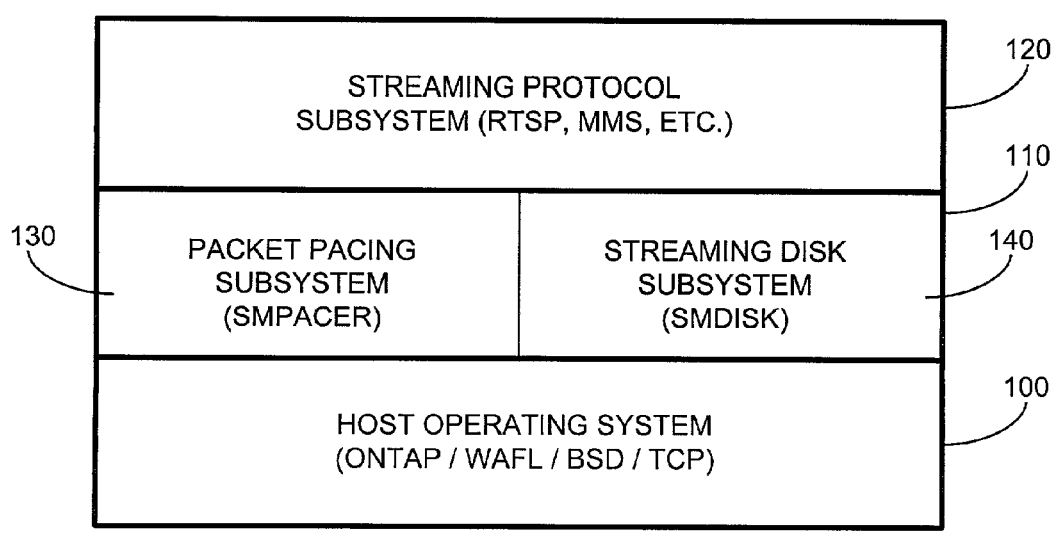
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, as illustrated, operating system level (layer) 100 includes portions of the Berkeley Software Distribution (BSD) operating system. Additionally, operating system level 100 includes software provided by the assignee of the present invention: Data ONTAP™, a Network Appliance brand operating system with Write Anywhere File Layout (WAFL™), a Network Appliance brand file system. In the present embodiment, the Data ONTAP™ operating system provides efficient file service by using file-system technology and a microkernel design geared towards network data access. The WAFL™ file system provides efficient file storage and retrieval based upon efficient access algorithms and data structures. Additionally, network communications using Transmission Control Protocol (TCP) and UDP are also supported at operating system level 100. Of course other types of operating systems can also be used.

As illustrated in FIG. 3, data handling level (layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. As will be described below, in one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level (layer) 120. As described below, protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjusts the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of SMPACER 130 will be given below.

FIGS. 4A-D illustrate a data format hierarchy according to an embodiment of the present invention. In particular, FIGS. 4A-D illustrate an internal storage structure/format used by embodiments for storing data that will be streamed to client systems.

An example of a streaming media cache implementing a data storage structure described below is a NetCache™ streaming media cache. NetCache™ (latest version 5.2) includes a combination of hardware and software available from the assignee of the present patent application. Embodiments of the present invention may stream data to client systems in a variety of streaming media protocols, including Microsoft Media Streaming (MMS) protocol used by Windows Media Player™; Real Time Streaming Protocol (RTSP) used by Quicktime™ from Apple Corporation and RealSystem™ from RealNetworks; and the like.

Figure 4A:
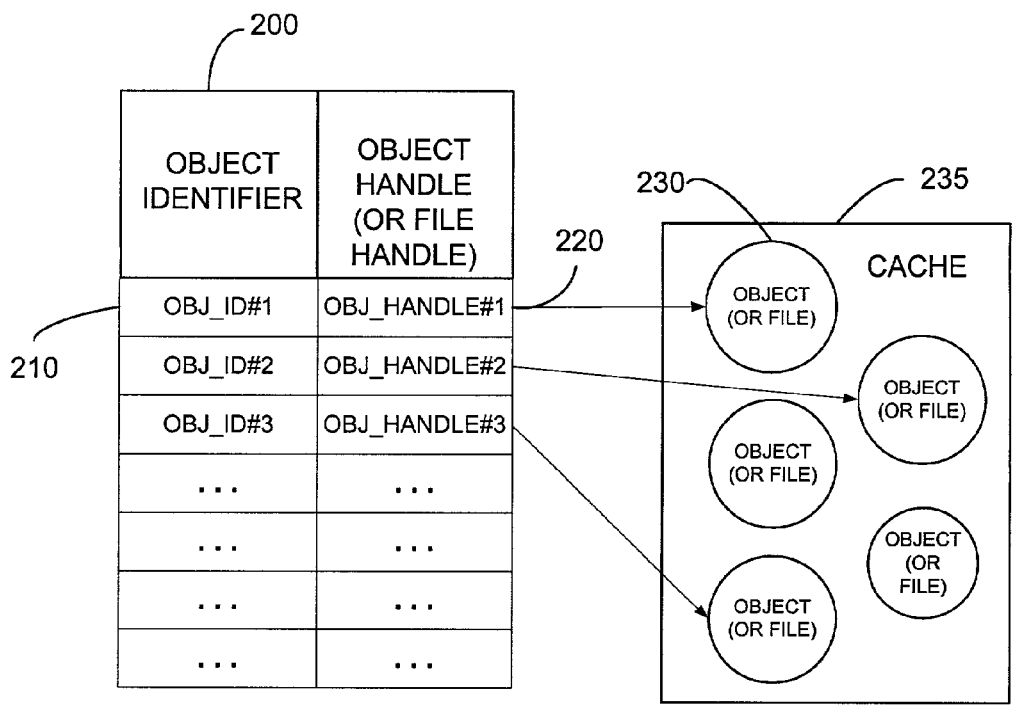
FIGS. 4A-D illustrate a data format hierarchy according to an embodiment of the present invention.

As illustrated in FIG. 4A, the present embodiment includes a cache entry table hash table 200 and a plurality of entries wherein each entry includes an object identifier 210. In one embodiment, object identifiers are file names that have been hashed. Further details regarding this aspect of the invention are disclosed in the co-pending application cited above. Cache entry table 200 typically also includes a plurality of object handles 220 for a particular object. In the present embodiment, object handles 220 may be a reference or pointer to an object 230 corresponding to the object identifier and stored in a cache 235.

In the present embodiment, object handles 220 may be used to retrieve the corresponding object 230 from cache 235. According to an embodiment of the present invention, objects 230 are stored as separate data files in cache 235. In this embodiment, each object handle 220 corresponds to a file handle and the object itself is stored as a file. Accordingly, the individual files are each independently accessible in cache 235 by a file system.

Figure 4B:
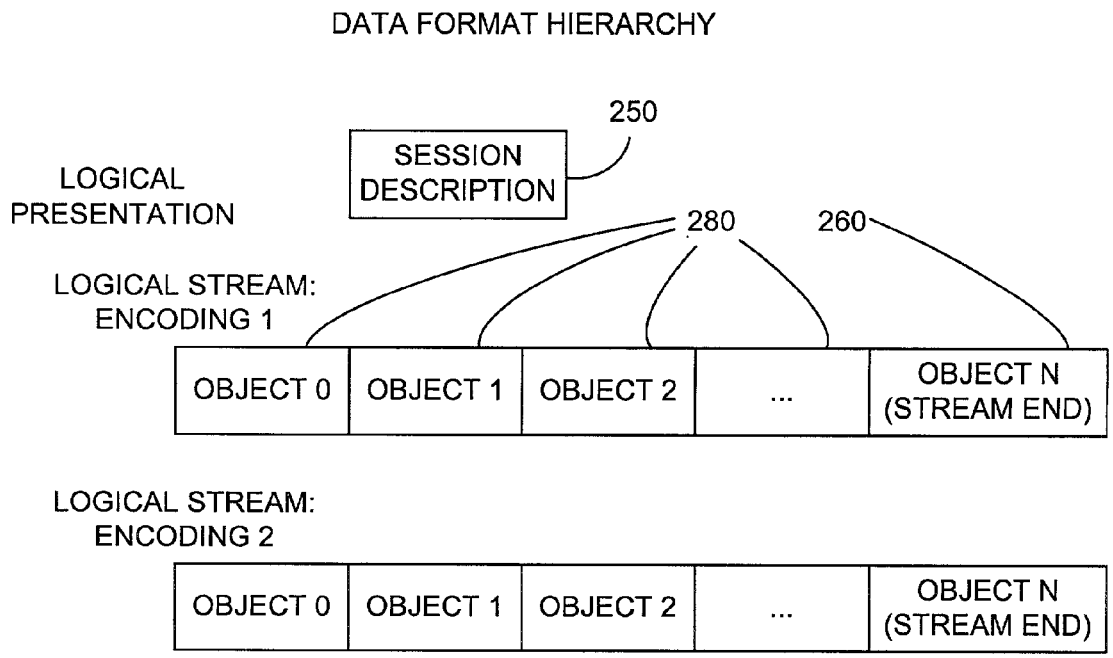

FIG. 4B illustrates a session description 250 (stored in a session data file or session data object) and logical streams of data 260 and 270 according to an embodiment. Logical stream 260 represents data for streaming media encoded in a first encoding scheme and logical stream 270 represents data for streaming media encoded in a second encoding scheme.

In the present embodiment, each of the encodings of the data are considered separate streams of data and are stored separately. This is in contrast to cases where multiple encodings of a data stream are packaged and stored within a single data file. An example of the latter is used by RealNetworks. In particular, a data file used by RealSystem may include an encoding of data destined for 56 Kbps clients, and an encoding of data destined for 384 Kbps clients. In the present embodiment, the encoding of data destined for different bit rate clients would be stored separately. For example, a 56 Kbps encoding would be stored in logical stream 260 and a 384 Kbps encoding would be stored in logical stream 270. Other typical types of parameters that may be varied for different encodings may include the bit rate, the content (e.g. abridged, unabridged), the media type (audio and/or video), thinning parameters (frame dropping), and the like.

In FIG. 4B, session description (stored in a session data object or session data file) 250 may include a description of the various streams of data stored in logical streams 260 and 270. The description may include an enumeration of the various encoding schemes (e.g. 56 Kbps, 128 Kbps, ISDN), copyright and authoring data, presentation or play-time (duration) of the stream, version data, and the like.

As an example, a sample session description for RTSP is as follows. In particular, it illustrates extrinsic properties of the media file (author, title, copyright), as well as intrinsic properties of the media file (number of media tracks, length of media file, encoding bitrate, MIME type, and codec of each media track, etc.). All of this data together serves to help uniquely identify a particular version of the URL used to access the streaming media file.

v=0
o=-983139433 983139433 IN IP4 172.30.200.154
s=G2 Video Experience
i=RealNetworks© 1998
t=0 0
a=SdpplinVersion:1610642970
a=Flags:integer;2
a=IsRealDataType:integer;1
a=StreamCount:integer;2
a=Title:buffer;
   "RzIgVmlkZW8gRXhwZXJpZW5jZQA="
a=Copyright:buffer;"qTE5OTgA"
a=Author:buffer;"UmVhbE5ldHdvcmtzAA=="
. . .
a=range:npt=0-0
m=audio 0 RTP/AVP 101
b=AS:6
a=control:streamid=0
a=range:npt=0-59.773000
a=length:npt=59.773000
a=rtpmap:101x-pn-realaudio
a=mimetype:string;"audio/x-pn-realaudio"
a=MinimumSwitchOverlap:integer;200
a=StartTime:integer;0
a=AvgBitRate:integer;6000
a=EndOneRuleEndAll:integer;1
a=AvgPacketSize:integer;288
a=SeekGreaterOnSwitch:integer;0
a=Preroll:integer;4608
a=MaxPacketSize:integer;288
a=MaxBitRate:integer;6000
a=RMFF 1.0 Flags:buffer;"AAQAAgAAAAIAAA=="
. . .
a=StreamName:string;"audio/x-pn-multirate-realaudio logical stream"
. . .
m=video 0 RTP/AVP 101
b=AS:50
a=control:streamid=1
a=range:npt=0-57.333000
a=length:npt=57.333000
a=rtpmap:101x-pn-realvideo
a=mimetype:string;"video/x-pn-realvideo"
a=MinimumSwitchOverlap:integer;0
a=StartTime:integer;0
a=AvgBitRate:integer;50000
a=EndOneRuleEndAll:integer;1
a=AvgPacketSize:integer;538
a=SeekGreaterOnSwitch:integer;1
a=Preroll:integer;5707
a=MaxPacketSize:integer;607
a=MaxBitRate:integer;50000
a=RMFF 1.0 Flags:buffer;"AAoAAgAAAAAAgA-CAAAAAgAAAAIAAA="
. . .
a=StreamName:string;"video/x-pn-multirate-realvideo logical stream"
. . .

In the present embodiment, logical streams of data, such as logical stream 260 is made up of a series of data objects 280. As described in FIG. 4A, data objects 280 are physically separate files that are directly accessible, independent of other data objects 280, through use of cache entry hash table 200. In this embodiment, data objects 280 together store the "media payload" provided by streaming media encoded in a given encoding scheme. For example, the media payload may include the actual media data included in streaming media packets for a 56 Kbps stream, or the like. More particularly, data objects 280 store the media payload that has been converted from the format in which the origin server stores the media data into the network format for transmission to the client system and the cache. Accordingly, the data objects include data that are optimized for delivery to the client system (e.g., encapsulated in network protocol).

In the present embodiment, each data object 280 is used to store data having an associated and/or a predetermined amount of play time (duration). That is, each data object 280 is used to store media payload data that will be output as streaming data that will be played on a client system for a specific amount of time or duration. For example, in one embodiment, each data object 280 is used to store data that will be streamed to a client as 20 seconds of a music stream, video stream, or the like. In other embodiments, each data object 280 may store a media payload (data) having different duration, such as less than or equal to approximately 5 seconds, 10 seconds, 20 seconds, 30 seconds, 1 minute, or the like.

In one embodiment of the present invention, the duration of output for the media payload stored in typical data objects may be fixed for each data object among logical streams 260 and 270 (e.g. 15 seconds of a stream). However, in other embodiments, the duration of output for the media payload stored in typical data objects in logical stream 260 and data objects in logical 270 may be different. For example, for logical stream 260, the duration may be 15 seconds per data object, and for logical stream 270, the duration may be 30 seconds per data object, and the like.

In another embodiment, each data object 280 may store specific amounts of data instead of a specific duration for data. For example, each data object 280 may store a predetermined number of bytes of data, for example, less than or equal to approximately 64 Kbytes, 128 Kbytes, 512 Kbytes, 1 Mbyte, or the like. In another embodiment, each data object 280 may simply store "chapters" or logical segments of a movie or video, and the like. In one embodiment, each data object 280 stores a fixed number of data chunks, as described below.

In one embodiment of the present invention, data objects 280 store non-overlapping data, or unique portions of the media data. That is, each of the data objects 280 may be configured to store a portion of the media data that is unique to a reference (e.g., URL) in the request to locations in the origin (or upstream) server at which the media file is stored. In another embodiment, data objects 280 may store media data that overlaps or is redundant.

Figure 4C:
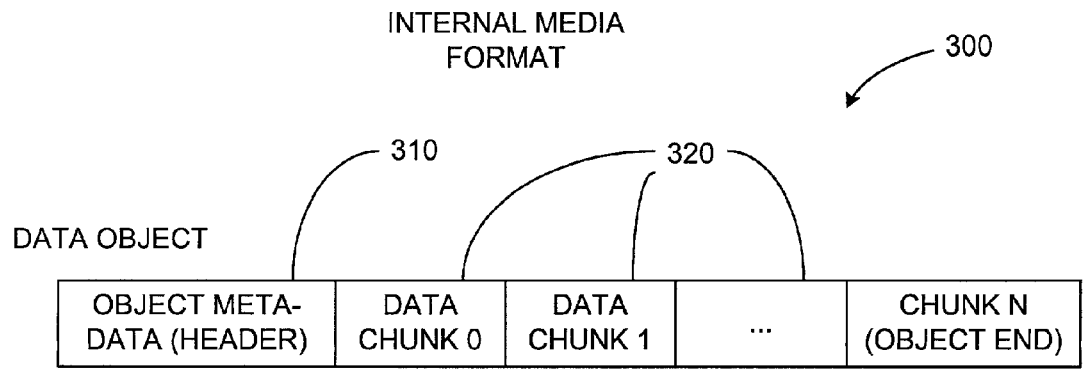

FIG. 4C illustrates a detailed description of a data object according to an embodiment of the present invention. As illustrated, FIG. 4C, a data object 300 includes object meta-data portion 310, and data chunks 320.

In this embodiment, object meta-data portion 310 is used to store data about data object 300. Such meta-data, or header data, may include file format version numbers, the number of data chunks 320 stored, the beginning presentation time and ending presentation time for data objects, and the like. In other embodiments, additional data may be stored in object meta-data portion 310 such as the data object number, protocol-specific per-data object data, a total number of bytes of payload and meta-data per data object, the number of data packets per data object, any end of stream indicators, check-sum bits and the like.

In one embodiment, each data chunk 320 is also used to store data of a predetermined amount of presentation or play time (duration). That is, each data chunk 320 is used to store streaming data that will be played on a client system for a specific amount of time. For example, in one embodiment, each data chunk 320 is used to store 20 seconds of a music stream. In other embodiments, each data chunk 320 may store data having different duration, such as less than or equal to approximately 5 seconds, 10 seconds, 20 seconds, 30 seconds, 1 minute, or the like. In one embodiment of the present invention, the duration may be fixed for each data chunk 320 within data object 300. However, in other embodiments, data objects may have different durations.

In another embodiment, each data chunk 320 may store specific amounts of data. For example, each data chunk 320 may store a predetermined number of bytes of data, for example, less than or equal to approximately 32 Kbytes, 64 Kbytes, 128 Kbytes, 512 Kbytes, 1 Mbyte, or the like. In one embodiment, each data chunk has a fixed number of data packets. In still other embodiments, data chunks 320 may have a varying number of data packets.

As will be described below, in the present embodiment, each data chunk 320 is used to store the actual streaming media data. More particularly, each data chunk 320 is used to store packets of data that will be streamed to a client system.

Figure 4D:
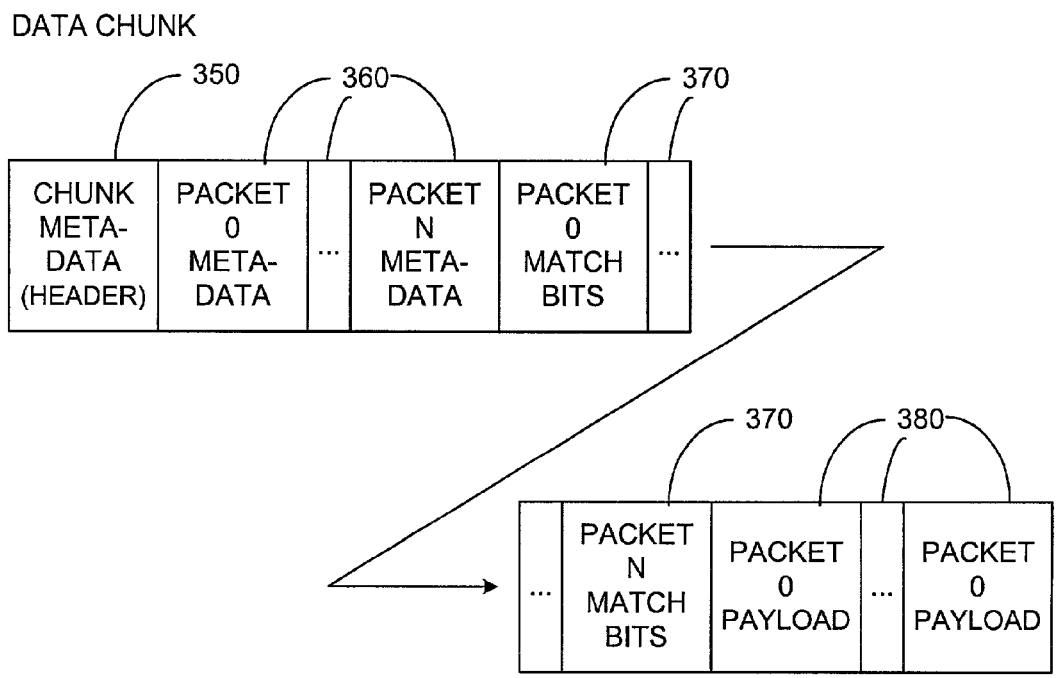

FIG. 4D illustrates a detailed description of a data chunk according to an embodiment of the present invention. Each data chunk 340 includes a chunk meta-data portion 350, packet meta-data 360, packet match bits 370, and packet payloads 380.

In this embodiment, chunk meta-data portion 350 is used to store data about data chunk 340. For example, chunk meta-data portion 350 may specify the number of packet payloads (packets) 380, a file offset for a previous data chunk within the same data object, a file offset for the next data chunk within the same data object, the number of data packets in a data chunk, compressed packet meta-data for the packets, described below, and the like. In additional embodiments, the data chunk meta-data header may also include packet meta-data for all the data packets including the duration (playback duration) of the payload, the presentation time of the payload (e.g. time within a movie), the delivery time of the payload (a time SMPACER 130 delivers the payload data to the client), protocol-specific data of the payload, and the like. Other types of data may be stored in chunk meta-data portion 350 in other embodiments, such as timing information, and the like.

Payload packets 380 are used to store streaming data packets that make up the streaming media. For example, payload packets 380 may store audio data, image data, audiovisual data, and the like. As will be described below, the streaming data packets may be received as stream of data from a streaming media server, or may be derived from a data file received from the streaming media server. For Windows Media Player streaming media, payload packets 380 range from 200 bytes to 18 Kbytes of data, and for RealSystem streaming media and QuickTime streaming media, packet payloads 380 range from approximately 200 to 1.5 Kbytes, typically 600 bytes. The number of packet payloads in data chunk 340 typically depends upon the size of packet payloads 380.

In this embodiment, packet meta-data 360 is used to store information relevant to or associated with each payload packet 380. Types of information may include the delivery time and the presentation time, file offset of the respective payload packet 380, and the like. In the present example, the delivery time is the time SMPACER 130 should send the packet payload to the client. In contrast, the packet presentation time is the time within the media stream that the payload is displayed by the client system.

Packet match bits 370 are used in the present embodiment to store information specific to the streaming media protocol. For example, packet match bits 370 may store data such as flags to identify the start of video key-frames, such as I, B, and or P key frames, or the like. In this embodiment, packet match bits 370 are used to determine the first sendable payload (keyframe) that satisfies a seek request by the client system. In one embodiment, the match bits may be embodied as single bit, however, in other embodiments of the present invention, additional match bits may be used to represent any number of criteria, for example, for selecting which packet will be delivered first, and the like. For Windows Media Player streaming media, packet match bits 370 may be a small as a single bit, and for RealSystem streaming media and QuickTime streaming media, packet match bits 370 are approximately 32 bits.

In this embodiment, the match bits are logically grouped together and separated from the remaining packet metadata. By grouping of the match bits together, the match bits can be compressed into, for example, a single word, thereby saving memory space.

Such key frame data are useful when a client system requests to move around the stream data, for example, when jumping to a particular presentation time T within the stream. In this embodiment, based upon packet match bits 370, the key frame immediately before presentation time T is retrieved and the play-back is begun from that key frame. It has been discovered that in one embodiment, playing-back stream data from the immediately-preceding keyframe reduces the amount of media artifacts or blank time of the stream when played on the client system.

Figure 5:
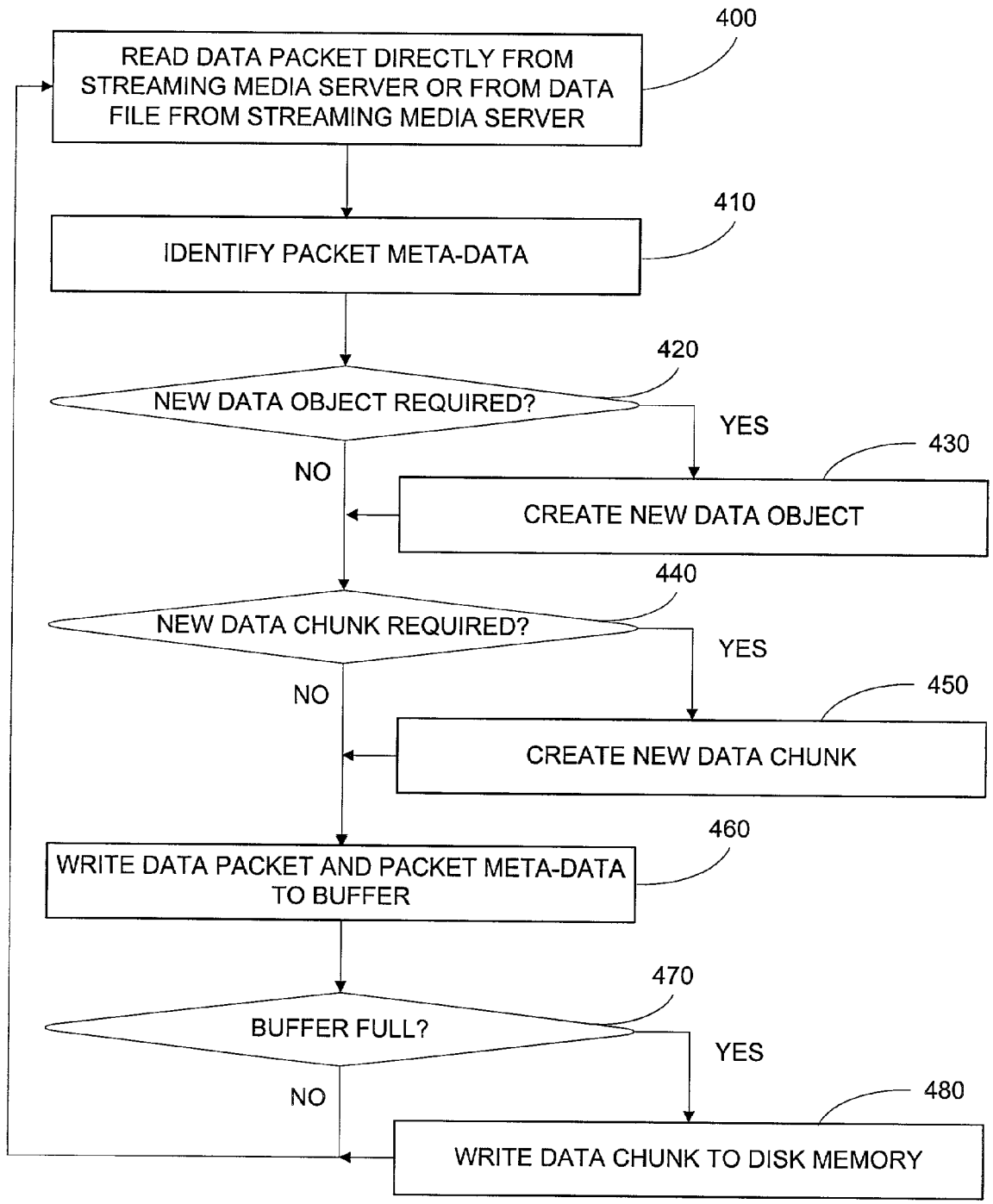
FIG. 5 illustrates a block diagram of a flow chart according to an embodiment of the present invention.

FIG. 5 illustrates a block diagram of a flow chart according to an embodiment of the present invention. More particularly, FIG. 5 illustrates a process of storing streaming media data into embodiments of the present invention. In the below embodiments, data are typically stored using the data format hierarchy illustrated in FIGS. 4A-D.

In FIG. 5, a data packet delivered from a streaming media server is received in step 400. In one embodiment, the streaming media server streams data to the streaming media cache. In such a case, a packet of data from the stream includes header data and a data packet (payload data). In another embodiment, the streaming media server sends a data file including the entire data stream to the streaming media cache. In this case, data packets and the header data are buried within the data file.

In the present embodiment, packet meta-data for a particular packet of data are then identified, step 410. In one embodiment of the present invention, the packet meta-data are derived from the header data of a particular data packet. In another embodiment, the packet is derived from the data file. The packet meta-data may include a presentation time for a data packet, an indication of a video key-frame, and the like. In this example, presentation time is the time within a media stream where the data packet is presented, for example, a data packet may have a presentation time of 20.5 seconds to 20.6 seconds representing when the data packet is output on the client system.

Next, a determination is made as to whether a new data object should be created, step 420. A new data object is typically created when a first data packet is received, or as described below a previous data object is full. In one embodiment, a new data object is created, step 430.

Next, a determination is made as to whether a new data chunk within the data object should be created, step 440. A new data chunk is typically created when a first data packet is received, or as described below, a data chunk is closed after including the previous data packet. In one case a new data chunk is created, step 450.

The data packet and the packet meta-data are then typically written to a buffer location in the streaming media cache random access memory, step 460. This buffer may be RAM 90 or buffer 97. In this embodiment, it is then determined whether the data packet is the last one for a given data chunk, step 470. If not, the process above is repeated for the next data packet.

When the data chunk is full, the chunk meta-data are determined, and the data chunk is written to random access memory (or to disk memory), step 480. In this embodiment, it is then determined whether the data chunk is the last one for a given data object, step 490. If not, the process above is repeated for the next data packet.

In this embodiment, when the data object is full, the object meta-data described above is determined, and the data object is written to disk memory, step 400. The process above may then be repeated until there are no more data packets in the media stream.

Accordingly, using the above steps, streaming media data may be received by a streaming media cache and stored in a disk memory in the object-based scheme described above. Additionally, streaming media data may be received in the form of a data file. This data file is parsed and the data are also stored in a disk memory in the object-based scheme described above.

In the above embodiment, most of the functions are performed by SMDISK 140, discussed in FIG. 3. In particular, steps 400 and 470 are typically performed at least in part by SMDISK 140; and step 480 is typically performed by a file system within operating system level 100.

Figure 6:
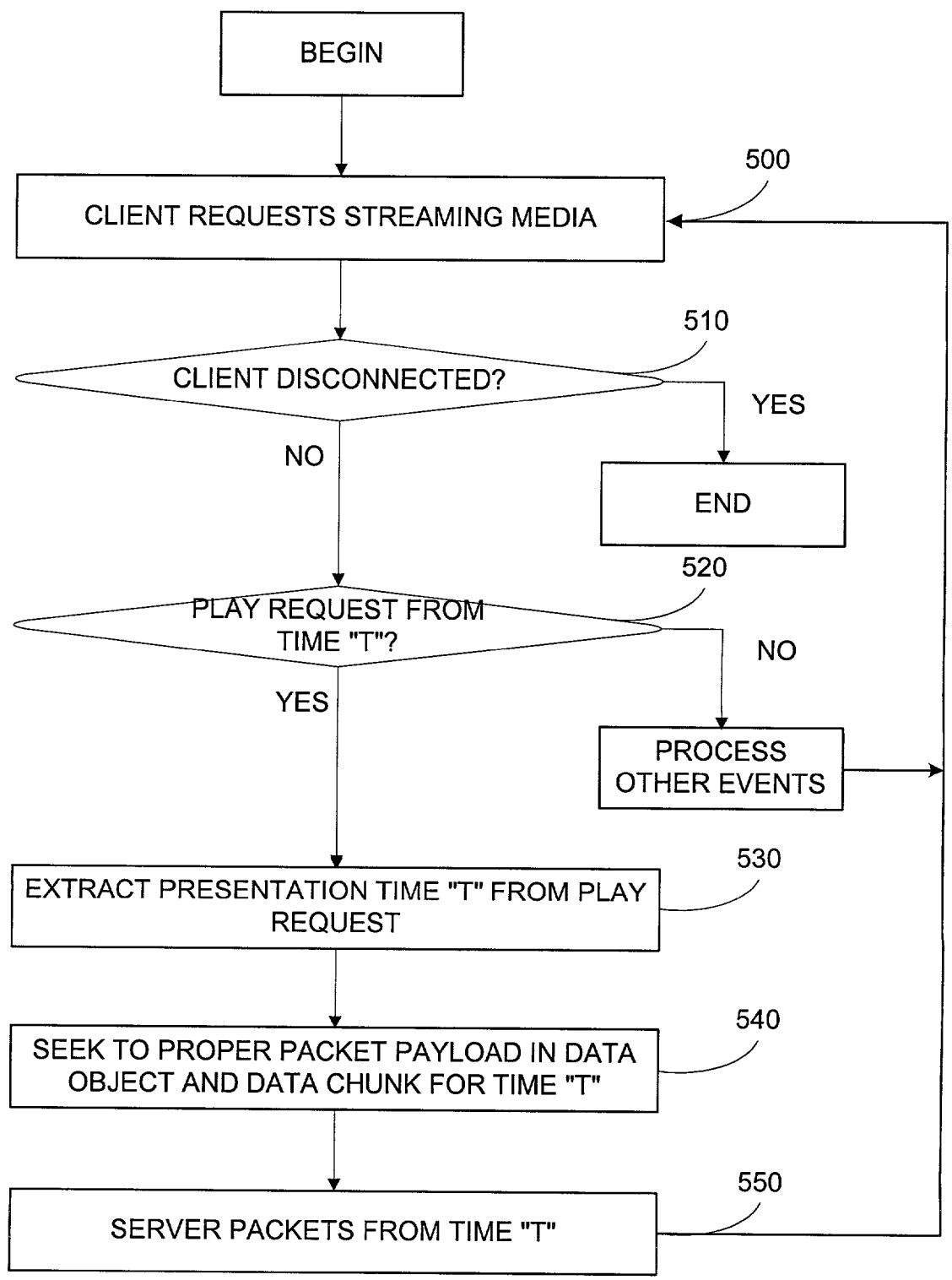
FIG. 6 illustrates a block diagram of a flowchart according to an embodiment of the present invention.

FIG. 6 illustrates a block diagram of a flowchart according to an embodiment of the present invention. In particular, FIG. 6 illustrates an overview of the process of retrieving data stored in a disk memory of the streaming media cache as described in FIGS. 4A-D and forming a stream of streaming media data to a client system.

In this example, a client system requests streaming media from an embodiment of a streaming media cache, step 500. In one case, a request for streaming media may be made directly from a client system or via a proxy. Such a request is typically in the form of a URL, or the like. Additionally, the request may specify a presentation time T that represents the time where the playback should begin. Most requests set T equal to zero, however T is typically non-zero when the client system jumps around the media stream (e.g. makes a "seek" request).

If the client system does not terminate its connection with the streaming media cache, step 510, a determination is made as to whether to playback the streaming data or not, step 520. In embodiments of the present invention, other types of client events may be specified, such as disconnecting, a play request, a pause request, a stop request, a seek request, notification to the cache that while the client is receiving streaming data from the cache, that a future object is missing and needs to be prefetched, and the like.

In the present embodiment, if streaming data are to be streamed to the client system, the presentation time T is determined, step 530. Next, based upon the time T, the payload packet that includes data having the presentation time T is located, step 540. This step is typically performed in part by SMDISK 140. Next, the data are then formatted for the specific protocol and then sent to the client system, step 550. This step is typically performed in part by SMPACER 130 and protocol level 120. More detailed descriptions of the above steps is given below.

Figure 7:
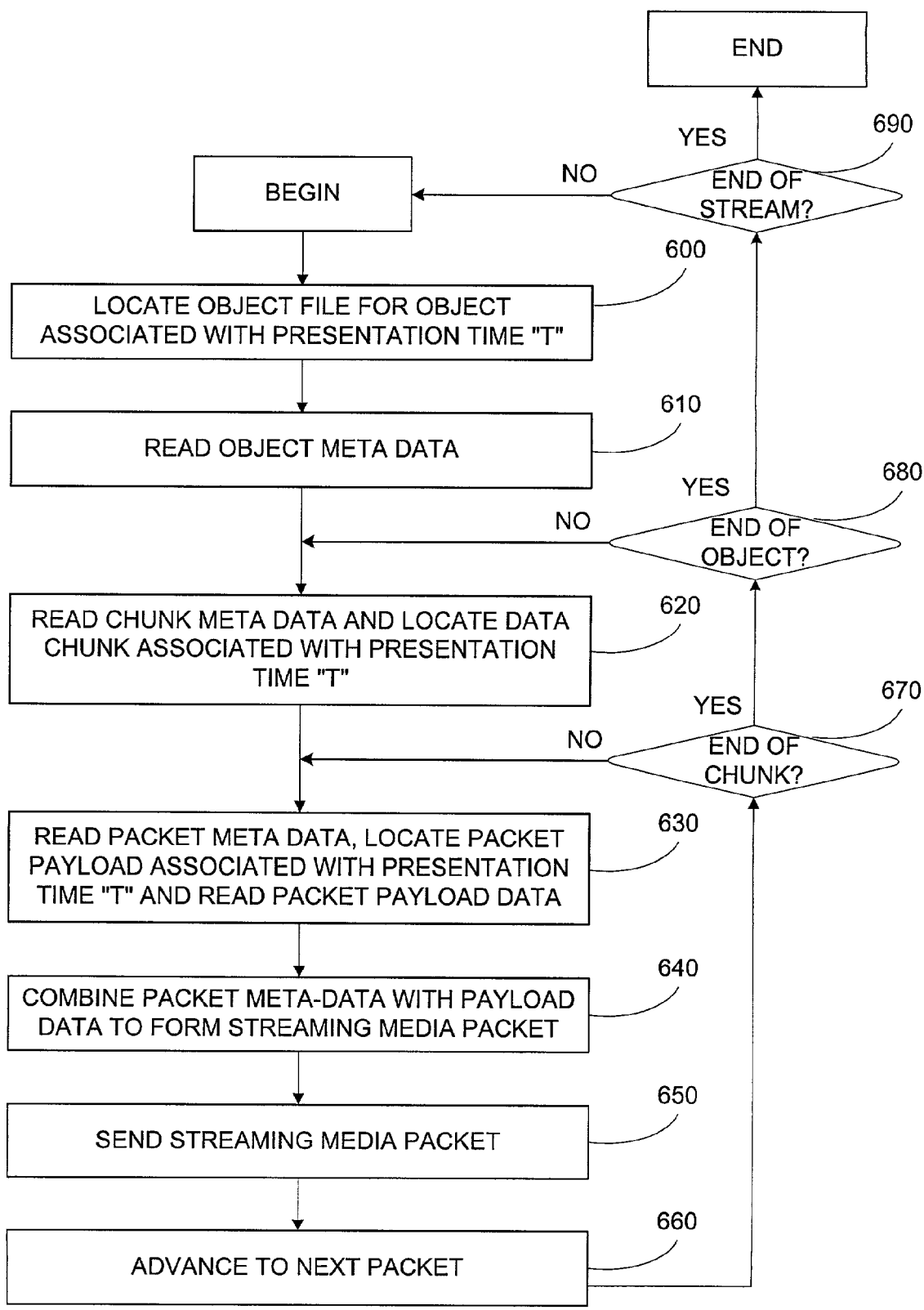
FIG. 7 illustrates a block diagram of a flowchart according to an embodiment of the present invention.

FIG. 7 illustrates a block diagram of a flowchart according to an embodiment of the present invention. In particular, FIG. 7 illustrates a more detailed process of locating and serving data.

In the present embodiment, in response to the presentation time T, the streaming media cache initially determines which data object to retrieve first, step 600. In the embodiment above, because an amount of time for each data object is fixed, for example at 10 seconds, the appropriate data object can easily be determined. For example, if the presentation time T were 5 minutes into a data stream, the appropriate data object would be the thirtieth one ((5 minutes×60 seconds/minute)/10 seconds/data object=30). In one embodiment, the URL of the file, along with the presentation time T is first hashed, and the hash is then used to access the cache entry hash table illustrated in FIG. 4A. In another embodiment, a URL of the file, the type of encoding of the file, a validator for the file, and the time T is hashed, and the hash is used to access the cache entry hash table illustrated in FIG. 4A. In return, the cache entry hash table provides the appropriate file handle of the targeted data object.

Based upon the file handle, the object meta-data are first retrieved, step 610. The data are typically stored within RAM 90. Based upon the number of chunks of data within the target data object, the target data chunk is determined. In the present embodiment, the meta-data of the first data chunk in a data object is first retrieved and stored within RAM 90. This data also includes the packet meta-data for that data chunk. Then, using the chunk meta-data, by using the file offset meta-data, the target data chunk containing the desired packet payload (keyed by presentation time) is determined.

Next, the chunk meta-data of the target data chunk is retrieved, step 620. The chunk meta-data are stored within RAM 90 for access by processor 50. As described above, the chunk meta-data may specify the number of payload packets stored within the chunk. Next, based upon the number of payload packets within the data chunk, the target payload packet is determined. The packet meta-data of the target payload packet is then retrieved and stored within RAM 90 for access by processor 50, step 630.

In the present embodiment, packet match bits 270 are also retrieved, and if compressed, uncompressed. The packet match bits 270 are typically stored within RAM 90.

In the present embodiment, portions of the packet meta-data and the target payload packet are then combined, step 640. The resulting packet is sent to the client system, step 650. In embodiments of the present invention, the target payload packet is the same as what was received from the origin server. Further, the packet meta-data are typically protocol-specific header data, i.e. the data depends upon the type of stream provided, such as Quicktime, Windows Media, and the like. for example, the meta-data may include a per-client sequence number, packet timing information, and the like.

After this target payload packet is sent, this embodiment attempts to iterate to the next payload packet, step 660. If the target payload packet is the last one of the target data chunk, step 670, this embodiment attempts to iterate to the next data chunk. If the target data chunk is the last one of the target data object, step 680, this embodiment attempts to iterate to the next data object. If the target data object is the last one of the stream, step 690, the stream terminates.

In the above embodiment steps 600-630 are performed at least in part by SMDISK 140; step 640 is performed at least in part by SMPACER 130; and step 650 is performed at least in part by SMPACER 130. More specifically, SMDISK 140 typically retrieves packet meta-data and packet payloads from the cache memory (hard disk) and stores them into a memory buffer, such as buffer 97. SMDISK 140 then gives pointers to these buffer locations to SMPACER 130, and in turn SMPACER 130 gives the pointers to these buffer locations to protocol level 120. An encoding protocol in protocol level 120 processes the meta-data portion, and importantly, then simply appends the packet payload to form an encoded packet. This encoded packet is sent to SMPACER 130 for paced delivery to a client.

As illustrated above, packet payloads are simply stored and retrieved from the cache memory (hard disk) and no processing occurs on such data. The payload data are merely segmented into convenient-sized data chunks and data objects by SMDISK 140 and then stored in the cache memory. As discussed above, these data objects are individually accessible on a file level.

Figure 8A:
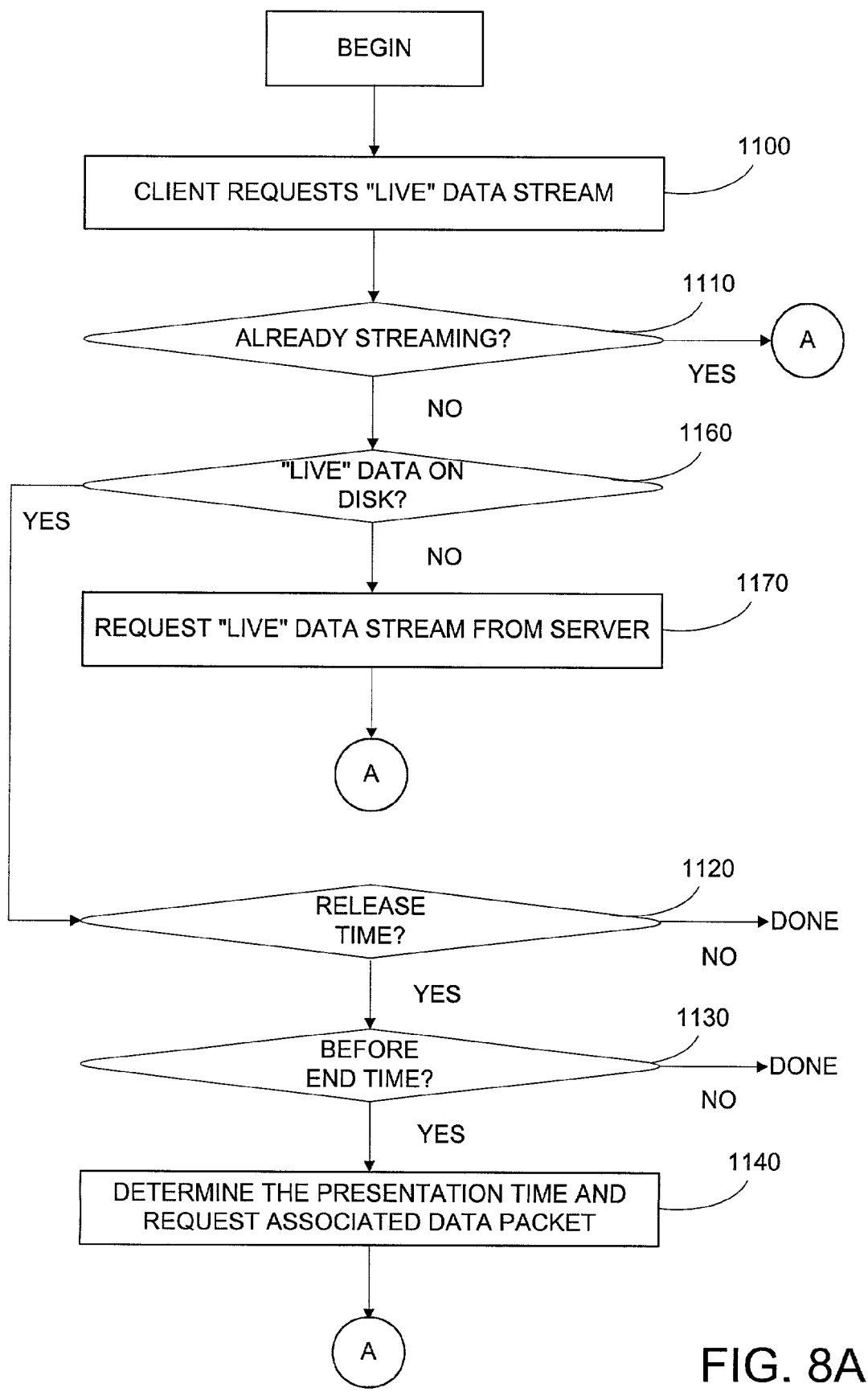
FIGS. 8A-C illustrate block diagrams of flowcharts according to an embodiment of the present invention.
Figure 8B:
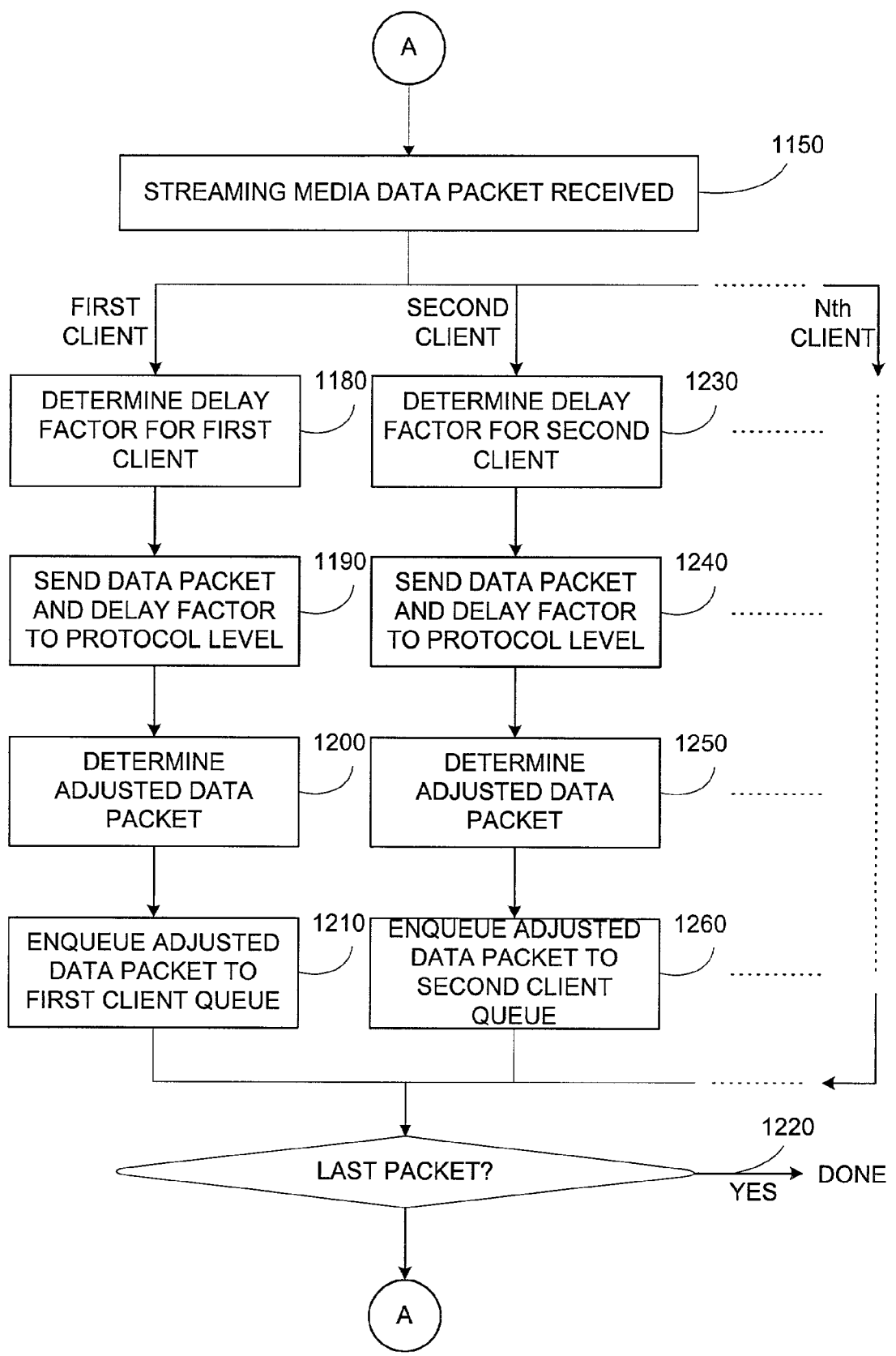
Figure 8C:
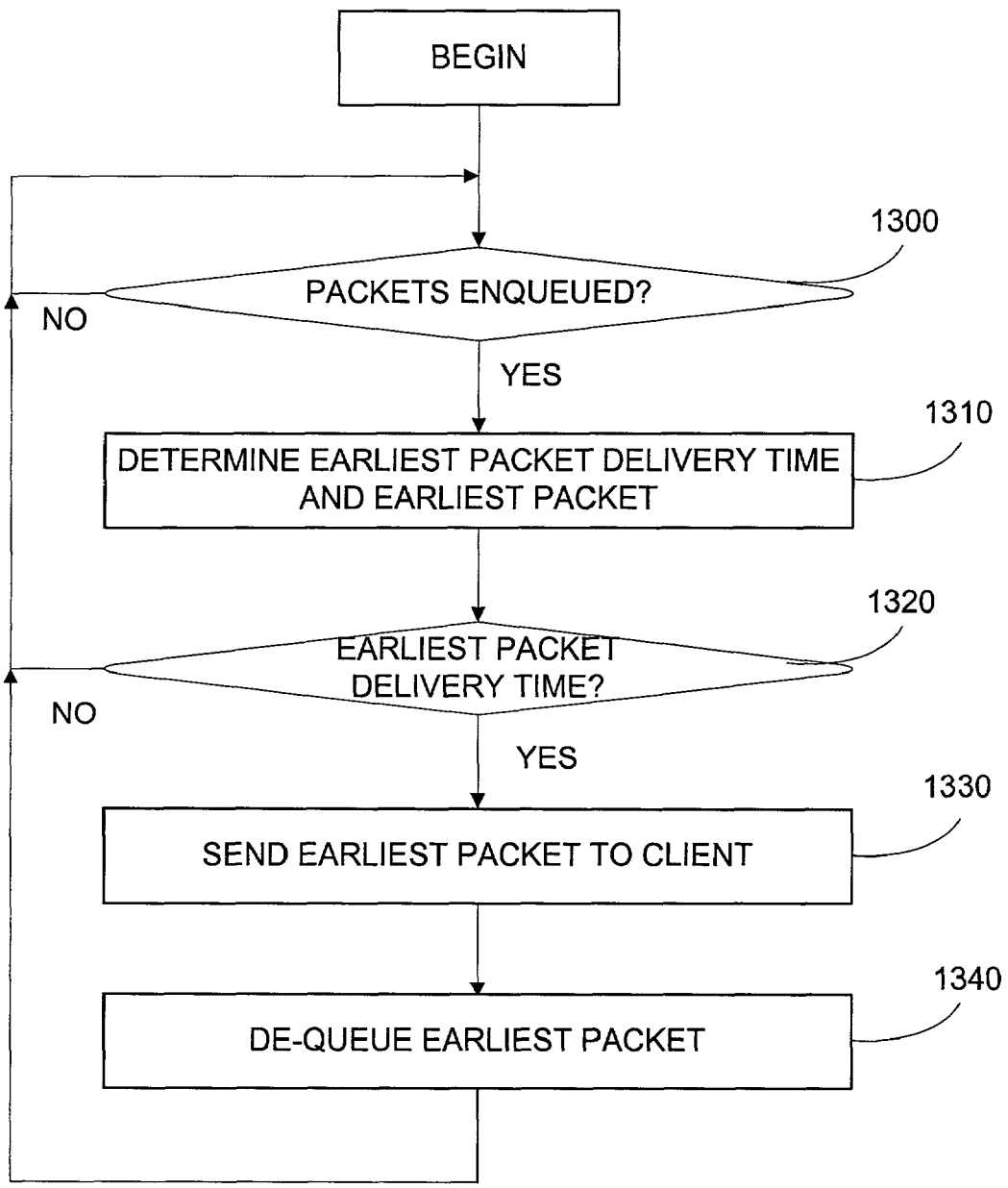

FIGS. 8A-C illustrate block diagrams of flowcharts according to an embodiment of the present invention. In particular, FIGS. 8A-B illustrates a process (process thread) of streaming media cache 27 receiving a "live" stream of data from media data server 37. As discussed above, the "live" stream of data may be a live performance or a "coordinated" webcast of a previously recorded performance, or the like.

In this embodiment, initially a first client requests the "live" stream of data, step 1100. As discussed above, the request may be in the form of a user clicking upon a URL or a hyperlink or typing-in a URL, or the like.

Next, streaming media cache 27 determines whether another client is already receiving the stream of media data, step 1110. Alternatively, the determination may be made as to whether streaming media cache 27 is already receiving the stream of media data. In either case, if the client is the first client, the process proceeds to step 1160. If another client is already receiving the stream, the process proceeds to step 1150.

In this example, if the client is the first client to request the stream of media data, streaming media cache 27 determines whether the content is already stored therein, step 1160. This step may be embodied as discussed above, and in the co-pending application cited above.

An embodiment where data is stored within streaming media cache 27 may be the "coordinated" web cast case discussed above. In this embodiment, streaming media cache 27 determines whether the starting presentation time of the coordinated webcast has been reached, step 1120. That is, streaming media cache 27 determines whether it is authorized to begin the webcast. If not, streaming media cache 27 may wait in this state. In other embodiments, streaming media cache 27 may simply terminate the process.

Next, in this embodiment, streaming media cache 27 determines whether the client request is before the ending presentation time of the coordinated webcast, step 1130. Again, streaming media cache 27 determines whether it is authorized to begin the webcast. If the client request is "too late" the coordinated webcast is over, and streaming media cache 27 may terminate the process.

If both of the conditions are met, streaming media cache 27 may determine the current presentation time within the webcast to provide to the first client, step 1140. Next, using the techniques described above, streaming media cache 27 may retrieve a streaming media data packet from the hard disk, step 1150.

In the case where the content is not stored within streaming media cache, streaming media cache 27 requests the stream of media data from media data server 37, step 1170. In one embodiment, streaming media cache 27 does not specify a presentation time within the stream of media data to media data server 37. In such a case, media data server 37 may determine the current presentation time within the webcast, and then deliver the stream of media data from that presentation time forward. This process may be similar to steps 1120-1140, described above. In another embodiment, streaming media cache 27 may determine the current presentation time within the webcast, and then make a specific request for streaming media from that presentation time forward.

In response to the request from streaming media cache 27, streaming media cache 27 may receive a streaming media data packet from media data server 37, step 1150.

At this point, it is contemplated that streaming media cache 27 stores a streaming media data packet in a buffer that was received either from media data server 37 or from the hard disk. As discussed above, the streaming media data packet typically includes a meta data portion and a payload portion. The meta data portion typically specifies a delivery time of the data packet, i.e. a time when streaming media cache 27 should send the data packet to the client.

It should be noted that typical streaming media data packets are often sent before the time those data packets are to be played on the client system. Accordingly, typical client systems have internal memories that are used to buffer data, before they are played to the user. Such buffers help smooth the play-back on the client system. However, they do not address the problem discovered by the inventors, as discussed in the Background.

In the present embodiment, for the first client a first offset factor (delay factor) R1 is then determined, step 1180. The delay factor R1 is selected from a whole millisecond from the range of 0-500 milliseconds in the present embodiment, and in other embodiments R1 may be selected from other ranges, for example 0-750 milliseconds, 250-1000 milliseconds, or the like. In other embodiments, smaller time increments may be selected, for example delay factors may be selected from the hundreds of microseconds, or less. In the present embodiment, R1 is pseudo-randomly selected from the specified range of values.

In other embodiments, streaming media cache 27 may specify a value for the delay factor for a first client, a second value for a second client, and the like. For example, streaming media cache 27 may specify a delay factor (R1) for the first client system to request a "live" stream of 0 milliseconds; a delay factor (R2) for a second client system of 500 milliseconds; a delay factor (R3) for a third client system of 50 milliseconds, and the like. It may be envisioned, that many other ways can be used to select delay factors for the client systems based in light of the above disclosure. Generally what is desired is that delay factors for the clients requesting a "live" data stream be different.

In this embodiment, the data offset R1 is associated with the first client for the duration of the session. That is, as will be described further below, all data packets sent to the first client will be delayed by the same amount of time (data offset). In other embodiments, the selected value of R1 is only used for less than all the data packets sent to the first client. In such a case, for different data packets, a different value for R1 may be used. This may result in the first client receiving data packets 1-100 75 milliseconds late, receiving data packets 101-200 150 milliseconds late, and the like.

Next, as described in conjunction with FIG. 3, above, the streaming media data packet is sent to "filters" in protocol level 120, step 1190. In the present embodiment, the delay factor R1 is also provided to protocol level 120. In response, the appropriate "filter" within protocol level 120 adjusts the delivery time of the data packet by at least the delay factor, step 1200. In effect, protocol level 120 delays the delivery time of the data packet by the factor R1 for the first client. Additional delay factors may use added to the delivery time for other purposes, for example, to adjust loading.

In this example, the adjusted data packet is then put onto an output queue for the first client, step 1210. The process of providing the adjusted data packet will be described later below.

If the data packet was the last data packet in the "live" data stream, step 1220, the process then terminates. Otherwise, the process may repeat for the first client for the next streaming media data packet.

In this example, if a second client system subsequently requests to receive the same "live" data stream, the process would proceed as follows. The second client requests the same stream as the first client system in step 1100. Next, in step 1110, streaming media cache 27 determines that it is already receiving the data stream for the first client system. Streaming media cache 27 then jumps to step 1150 and receives the next data packet from either streaming media server 37 or the hard disk.

It should be understood that, streaming media cache 27 typically receives only one copy of a data packet from either streaming media server 37 or the hard disk. In one embodiment, streaming media cache 27 then "splits" (makes a copy of) the data packet for each client. Accordingly, the first client system and the second client system each receive separate data packets that have adjusted delivery times. In another embodiment, streaming media cache 27 merely provides the appropriate reference (pointer) to the payload of the data packet. In this case, the first client system and the second client system refer to the same data packet payload, however the meta data of the packets are still stored separately.

Next, streaming media cache 27 determines that there is a second client, and determines a second offset factor (delay offset) R2 for the second client, step 1230. As described above, the value of R2 may be selected in a variety of ways. Further the value of R2 may be fixed for the second client, or may be modified for different data packets.

Similar to above, the streaming media data packet is also sent to "filters" in protocol level 120, step 1240 along with the delay factor R2. In response, the appropriate filter within protocol level 120 adjusts the delivery time of the data packet by at least the delay factor, step 1250. In effect, protocol level 120 delays the delivery time of the data packet by the delay factor R2 for the second client. Additional delay factors may use added to the delivery time for other purposes, for example, to adjust loading.

In this example, the adjusted data packet is then put onto an output queue for the second client, step 1250. The process then proceeds to step 1220, as discussed above. The process will typically repeat as described above for additional client system requests.

It is typically expected that for small number of client systems the values of R1 and R2 will be different. However when streaming media cache 27 provides the "live" streaming media data for a large number of clients, for example, 1000 clients systems, or 10,000 client systems, there may be overlap in delay factors depending upon the increments used.

FIG. 8C illustrates a process (process thread) of streaming media cache 27 serving the stream of data to client systems 17.

In this embodiment, the client process within streaming media cache initially determines whether any adjusted data packet has been placed in the queue, step 1300. This adjusted data packet is the one discussed in steps 1210 or 1250, above. If one or more adjusted data packets appears, streaming media cache 27 determines the delivery time of the adjusted data packets in the queue, and determines the adjusted data packet having the earliest delivery time, step 1310.

Next, streaming media cache 27 determines whether it is time to send that adjusted data packet, step 1320. If not, the process returns to step 1300. If so, the adjusted data packet is sent to the client system, step 1330, and the adjusted data packet is de-queued, step 1340. The process then returns to step 1300.

It is contemplated in the present embodiment, that streaming media cache 27 invokes multiple client process threads, as described above, one thread for each client system. Each thread would monitor the output queue for each client system and provide the adjusted data packets at the appropriate delivery times. In other embodiments, there may be fewer client process threads than clients, or even only a single client process thread for all clients. Specific embodiments would depend upon ordinary engineering considerations based upon this disclosure.

Figure 9A:
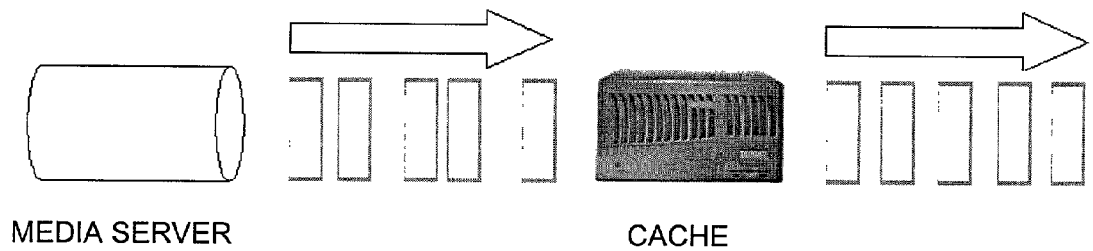
FIGS. 9A-C illustrate examples according to a present embodiment.
Figure 9B:
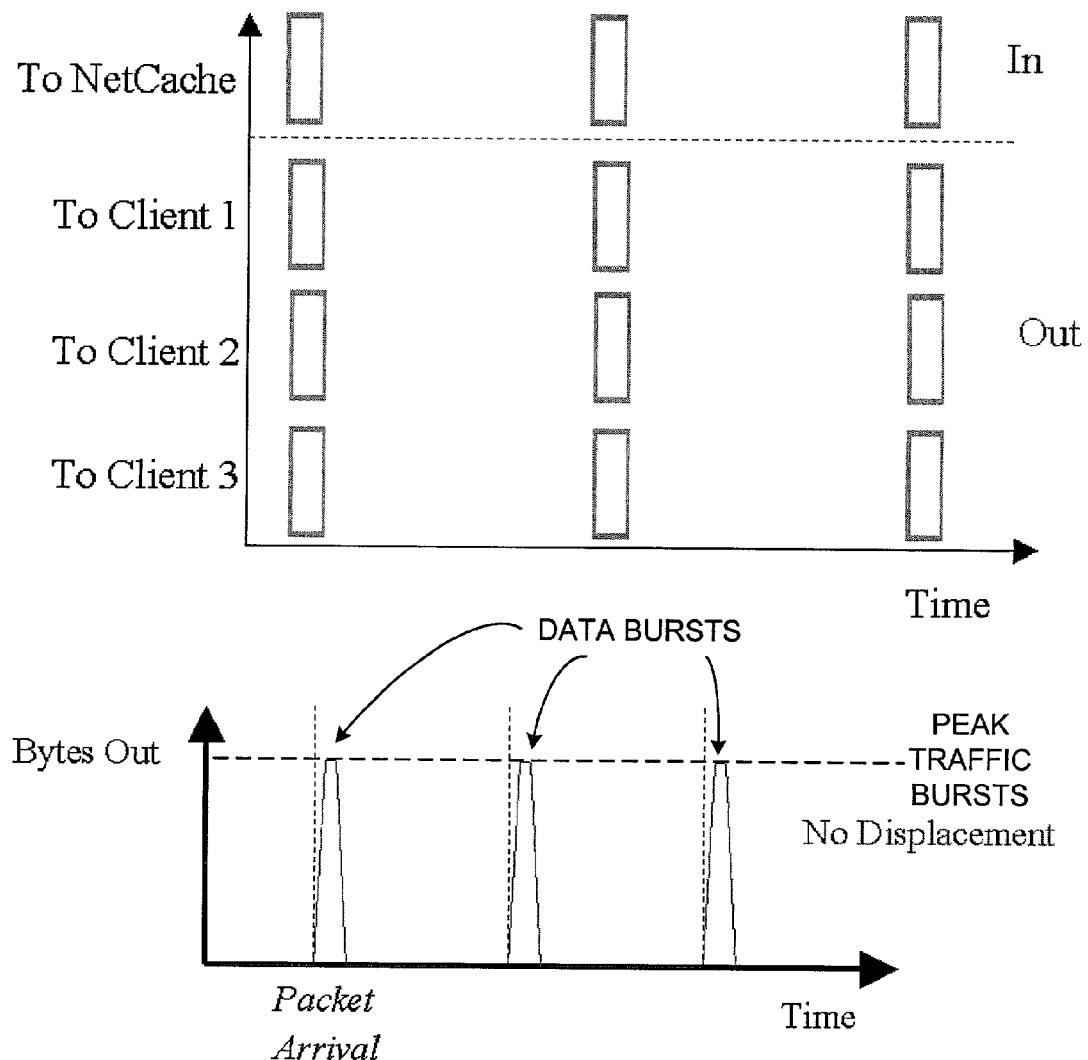
Figure 9C:
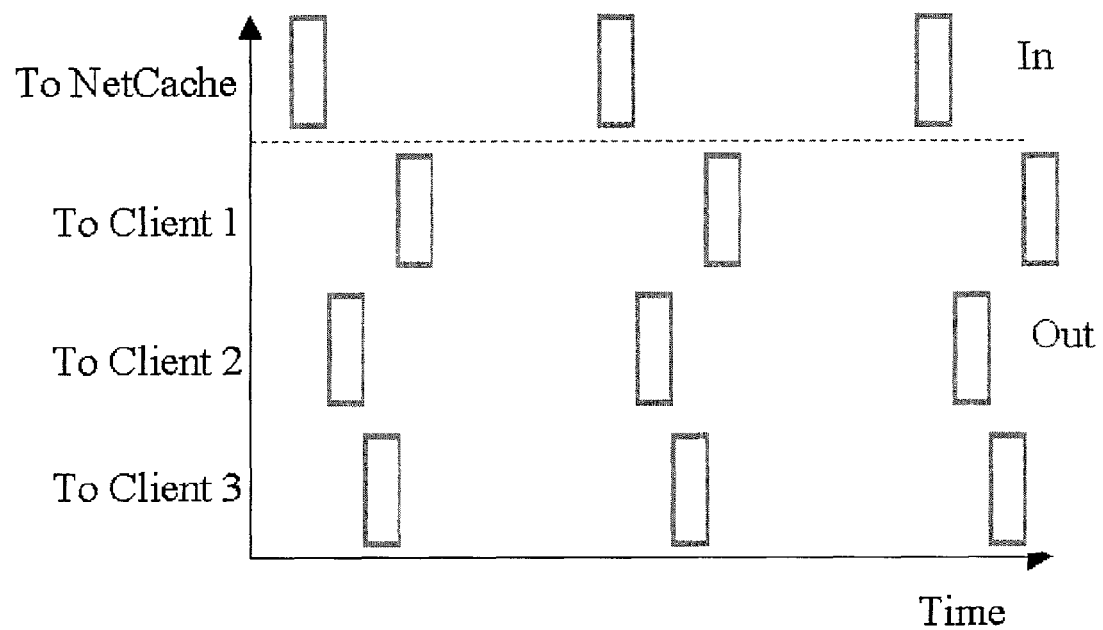
Figure 9C:
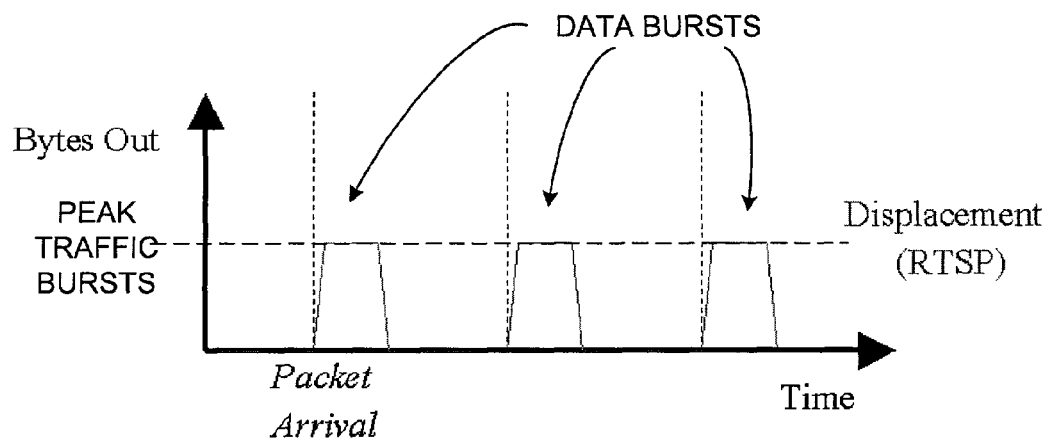

FIGS. 9A-C illustrate examples according to a present embodiment. In particular, FIG. 9A illustrates embodiments of the present invention being used to smooth out downstream data.

In the example in FIG. 9A, data packets typically arrive from an upstream media server in an uneven pace, and often out of order. However, embodiments of the present invention buffer data and deliver data to client systems depending upon the delivery time for each packet. As a result, as illustrated, the pace of downstream packets from a streaming media cache is much smoother.

As illustrated in FIG. 9B, without embodiments of the present invention, packets that are received are output to the different clients at the same time. This results in relatively high peak (high bursts of) traffic to downstream routers, as shown. In contrast, as illustrated in FIG. 9C, packets that are received are output to the different clients at different times. This results in a lower peak (lower bursts of) traffic to downstream routers, as shown.

Figure 10A:
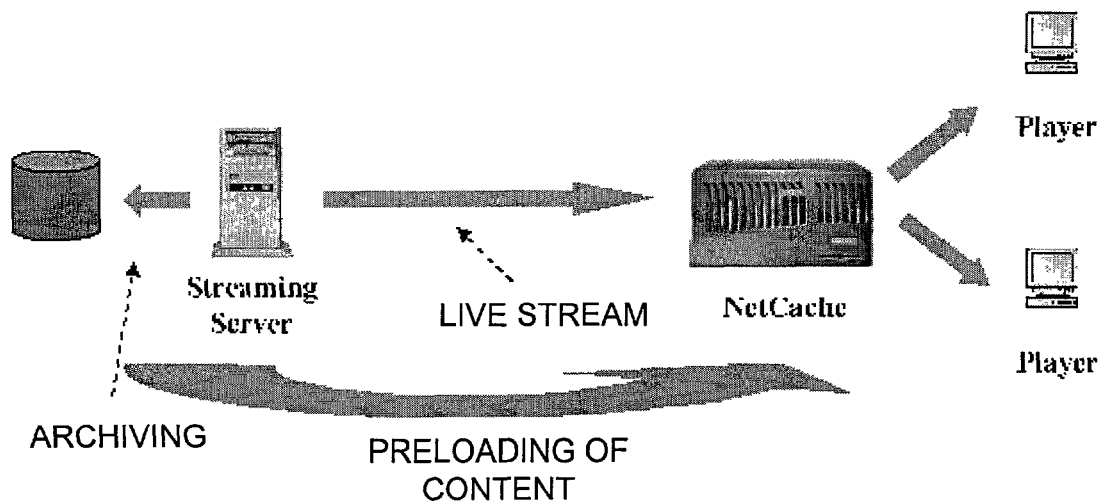
FIGS. 10A-B illustrate an additional embodiment of the present invention.
Figure 10B:
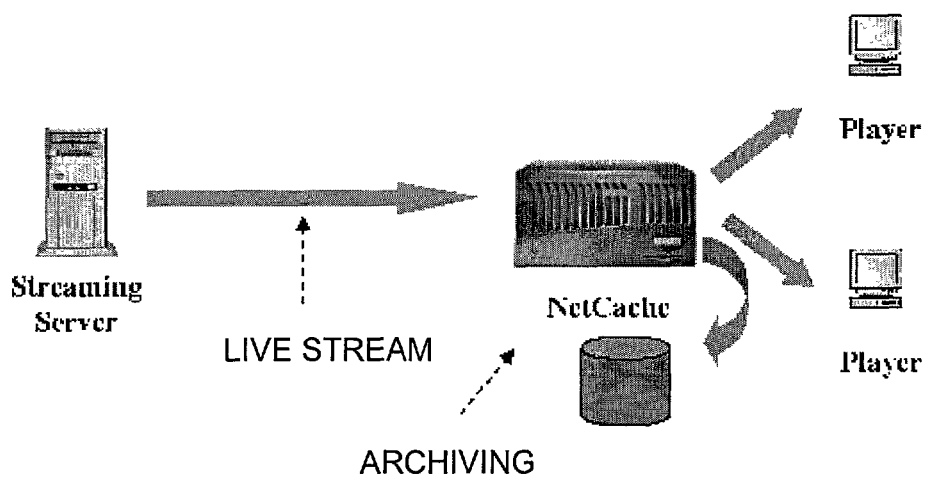

FIGS. 10A-B illustrate additional embodiments of the present invention.

FIG. 10A illustrates an embodiment where a live (real-time) data stream is stored in streaming media server 37 while the data stream is streamed to streaming media cache 27. In this embodiment, after the data stream has been recorded, it is sent as a data file to streaming media cache 27. In such an embodiment, streaming media cache 27 can serve the data stream to clients that later request the data, i.e. replay the data. Examples of streaming media cache 27 receiving large data files, pre-computing a packet payload, and serving streaming media data is discussed in the co-pending application cited above.

FIG. 10B illustrates an embodiment where a "live" data stream is recorded within streaming media cache 27 while it is received from streaming media server 37. One such embodiment includes the functionality described in FIGS. 4A-C through FIG. 7 and the functionality described in FIG. 8-C.

Advantages to embodiments of the present invention are believed to include that downstream traffic of a streaming media cache are smoothed out. As discussed above, embodiments of the present invention, deliver data to client packets at an even rate, depending upon delivery time, even though data from a streaming media server may be uneven.

Another advantage is that the traffic peaks (bursts), would be reduced. As disclosed above, because different clients are given pseudo-random delay offsets in various embodiments of the present invention, the number of packets output to clients at any one time (traffic bursts) is reduced. Further, because the traffic bursts to downstream routers is reduced, the number of packets dropped or lost is reduced. Accordingly, it is expected that playback on client systems will be smoother and of better quality.

Other embodiments of the present invention may apply to packets of data other than streaming media data. For example, it is envisioned that embodiments of the present invention may be applied to any data packet that is framed, such as an Ethernet packet, or the like.

In view of the above disclosure, many other variations can be envisioned. For example, the data hierarchy can simply be modified according to engineering requirements. As an example, the range of delay factors can easily be changed and varied based upon experimental data, and the like. As another example, the increments of delay factors may also be varied according to engineering requirements.

The invention has been described in embodiments above as a file cache or a streaming media cache. It should be understood, however, that embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising: receiving, at a streaming media cache, a request from a first client system for a stream of media data, the stream of media data including a first streaming media data packet representing a particular portion of the stream of media data; receiving, at the streaming media cache, a request from a second client system for the stream of media data; receiving, at the streaming media cache, the first streaming media data packet from an upstream server, the first streaming media data packet including a delivery time at which the first streaming media data packet scheduled to be delivered to each of the first and second client systems; pseudo-randomly selecting a first delay value and adding the first delay value to the delivery time of the first streaming media data packet to form a first modified delivery time for the first streaming media data packet; pseudo-randomly selecting a second delay value and adding the second delay value to the delivery time of the first streaming media data packet to form a second modified delivery time for the first streaming media data packet; modifying the first streaming media data packet with the first modified delivery time in the streaming media cache to form a first modified first streaming media data packet; adding the first delay value to a delivery time of a second streaming media data packet of the stream of media data to form a first modified delivery time for the second streaming media data packet; adding the second delay value to the delivery time of the second streaming media data packet to form a second modified delivery time for the second streaming media data packet; modifying the first streaming media data packet with the second modified delivery time in the streaming media cache to form a second modified first streaming media data packet; modifying the second streaming media data packet with the first modified delivery time to form a first modified second streaming media data packet; outputting the first modified first streaming media data packet from the streaming media cache to the first client system to cause the first modified first streaming media data packet to be delivered to the first client system at the first modified delivery time; and outputting the second modified first streaming media data packet from the streaming media cache to the second client system to cause the second modified first streaming media data packet to be delivered to the second client system at the second modified delivery time.

2. The method of claim 1, wherein pseudo-randomly selecting the first delay value includes pseudo-randomly selecting the first delay value from within a specified time range.

3. The method of claim 2, wherein the time range is 0 to approximately 500 milliseconds.

4. The method of claim 1, further comprising storing a payload portion of the first streaming media in a storage unit within the streaming media cache.

5. The method of claim 2, further comprising: modifying the second streaming media data packet with the second modified delivery time to form a second modified second streaming media data packet; outputting the first modified second streaming media data packet to the first client system at the first modified delivery time; and outputting the second modified second streaming media data packet to the second client system at the second modified delivery time.

6. The method of claim 5 further comprising:
receiving a data file from the upstream server, the data file including a payload portion of the first streaming media data packet and a payload portion of the second streaming media data packet; and
storing the data file in a storage within the streaming media cache.

7. A computer system for providing streaming media data to client systems, the computer system comprising: a processor; a network interface, coupled to the processor, through which to communicate data over a network; and a computer-readable storage medium, coupled to the processor and storing a first thread to configure the processor to receive a request from a first client system and a second client system for a stream of data packets representing particular portions of a media stream, wherein the stream of data packets includes a first data packet and a second data packet, the first thread also configured to pseudo-randomly select a first client delay and to pseudo-randomly select a second client delay; a second thread to configure the processor to receive the first data packet from an upstream server, wherein the first data packet specifies a first delivery time, the second thread also configured to form a first delayed first data packet from the first data packet based on the first client delay and to form a second delayed first data packet from the first data packet based on the second client delay, and wherein the first delayed first data packet specifies a first delayed delivery time and the second delayed first data packet specifies a second delayed delivery time; a third thread to configure the processor to receive the second data packet from the upstream server, wherein the second data packet specifies a first delivery time for the second data packet, the second thread also configured to form a first delayed second data packet from the second data packet based on the first client delay and to form a second delayed second data packet from the second data packet based on the second client delay, and wherein the first delayed second data packet specifies a first delayed delivery time for the first delayed second data packet and the second delayed second data packet specifies a second delayed delivery time for the second delayed second data packet; a fourth thread to configure the processor to deliver the first delayed first data packet to the first client system to cause the first delayed data packet to be delivered to the first client system at the first delayed delivery time, instead of delivering the first data packet to the first client system at the first delivery time; and a fifth thread to configure the processor to deliver the second delayed first data packet to the second client system to cause the second delayed first data packet to be delivered to the second client system at the second delayed delivery time, instead of delivering the first data packet to the second client system at the first delivery time.

8. The computer system of claim 7, wherein the second thread is configured to modify the first delayed first data packet based on the first client delay by adding the first client delay to the first delivery time.

9. The computer system of claim 8, wherein the first client delay is pseudo-randomly selected from a range of 0 to approximately 500 milliseconds.

10. The computer system of claim 7, wherein the plurality of threads further comprising a sixth thread configured to store payload portions of the first data packet and payload portions of the second data packet in a memory.

11. The computer system of claim 7, wherein the first packet of data is framed.

* * * * *